(12) United States Patent
Sun

(10) Patent No.: US 10,349,282 B2
(45) Date of Patent: Jul. 9, 2019

(54) RADIO RESOURCE MANAGEMENT APPARATUS, METHOD AND SYSTEM

(71) Applicant: SONY CORPORATION, Tokyo (JP)

(72) Inventor: Chen Sun, Haidian District (CN)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 14/768,943

(22) PCT Filed: Apr. 2, 2014

(86) PCT No.: PCT/CN2014/074628
§ 371 (c)(1),
(2) Date: Aug. 19, 2015

(87) PCT Pub. No.: WO2014/161488
PCT Pub. Date: Oct. 9, 2014

(65) Prior Publication Data
US 2015/0382199 A1 Dec. 31, 2015

(30) Foreign Application Priority Data

Apr. 2, 2013 (CN) .......................... 2013 1 0113100

(51) Int. Cl.
*H04W 16/10* (2009.01)
*H04W 16/14* (2009.01)
(52) U.S. Cl.
CPC ........... *H04W 16/10* (2013.01); *H04W 16/14* (2013.01)
(58) Field of Classification Search
CPC .................................................... H04W 16/12
USPC ....................................................... 455/447
See application file for complete search history.

(56) References Cited

U.S. PATENT DOCUMENTS

| 8,311,554 B2* | 11/2012 | Abedi | H04W 16/14 370/230 |
| 2009/0034508 A1* | 2/2009 | Gurney | H04W 16/14 370/351 |
| 2009/0098904 A1* | 4/2009 | Fujii | H04W 16/14 455/552.1 |
| 2009/0285172 A1* | 11/2009 | Hansen | H04W 16/10 370/329 |
| 2010/0261423 A1* | 10/2010 | Stanforth | H04H 20/72 455/3.01 |

(Continued)

FOREIGN PATENT DOCUMENTS

CN 102595420 A 7/2012

OTHER PUBLICATIONS

International Search Report and Written Opinion dated Jul. 8, 2014 for PCT/CN2014/074628 filed on Apr. 2, 2014.

*Primary Examiner* — Lester G Kincaid
*Assistant Examiner* — Frank E Donado
(74) *Attorney, Agent, or Firm* — Xsensus LLP

(57) ABSTRACT

A spectrum management system includes circuitry that determines available spectrum for a secondary communication system. The available spectrum is determined based on a disturbance tolerance of a primary communication system that is managed by the spectrum management system and a disturbance tolerance of another primary communication system that is managed by another spectrum management system. The circuitry then causes the setting of a spectrum for the secondary communication system based on the available spectrum and whether or not a spectrum request is received from the secondary communication system.

16 Claims, 9 Drawing Sheets

(56) References Cited

U.S. PATENT DOCUMENTS

| | | |
|---|---|---|
| 2011/0028179 A1 | 2/2011 | Sawai et al. |
| 2011/0294514 A1 | 12/2011 | Kulkarni |
| 2013/0102350 A1 | 4/2013 | Sawai et al. |
| 2013/0301609 A1* | 11/2013 | Smith ............... H04W 72/0493 370/331 |
| 2014/0248916 A1* | 9/2014 | Nakamuru ............ H04W 16/14 455/501 |
| 2014/0248919 A1* | 9/2014 | Li ......................... H04W 52/38 455/522 |
| 2014/0254558 A1* | 9/2014 | Kasslin ................. H04W 36/36 370/331 |
| 2014/0315590 A1* | 10/2014 | Shimomura .......... H04W 16/14 455/501 |
| 2015/0373554 A1* | 12/2015 | Freda .................... H04W 16/14 455/450 |

* cited by examiner

RADIO RESOURCE MANAGEMENT APPARATUS, METHOD AND SYSTEM

FIELD OF THE INVENTION

The present disclosure relates to radio resource management in wireless communication, in particular to a radio resource management apparatus, method and system for a communication system including primary systems and secondary systems.

BACKGROUND OF THE INVENTION

With the evolution of wireless communication system, user's demands for high quality, high speed and new services are increasing, thus the wireless communication operators and manufacturers need to continually improve the systems to meet user's requirements. In this case, a lot of frequency spectrum resources (represented by time, frequency, bandwidth, the allowable maximum transmission power, etc.) are required to support new services and meet the demands of high-speed communication. However, the limited frequency spectrum resources have been allocated to certain operators and services, and new available frequency spectrums are rare and expensive, so, how to fully utilize the limited frequency spectrum resources is a challenge to be solved currently.

SUMMARY OF THE INVENTION

A brief summary of the present disclosure is given below, so as to provide a basic understanding on some aspects of the present disclosure. It will be appreciated that the summary is not an exhaustive description of the present disclosure. It is not intended to define a key or important part of the present disclosure, nor is it intended to limit the scope of the present disclosure. It aims to give some concepts in a simplified form, as a preface to the more detailed description described later.

In a first exemplary aspect, a spectrum management system includes circuitry that determines available spectrum for a secondary communication system based on a disturbance tolerance of a primary communication system managed by the spectrum management system and a disturbance tolerance of another primary communication system managed by another spectrum management system, and that causes setting of a spectrum for the secondary communication system based on the available spectrum and whether or not a spectrum request is received from the secondary communication system.

In a second exemplary aspect, a method of managing spectrum includes determining, in circuitry of a spectrum management system, available spectrum for a secondary communication system based on a disturbance tolerance of a primary communication system managed by the spectrum management system and a disturbance tolerance of another primary communication system managed by another spectrum management system. The method also includes causing, by the circuitry of the spectrum management system, setting of a spectrum for the secondary communication system based on the available spectrum and whether or not a spectrum request is received from the secondary communication system.

In a third exemplary aspect, A non-transitory computer-readable medium is encoded with computer-readable instructions that when executed by a computer, cause the computer to perform a method that includes determining available spectrum for a secondary communication system based on a disturbance tolerance of a primary communication system managed by a spectrum management system and a disturbance tolerance of another primary communication system managed by another spectrum management system. The method also includes causing setting of a spectrum for the secondary communication system based on the available spectrum and whether or not a spectrum request is received from the secondary communication system.

In a fourth exemplary aspect, s spectrum management system includes circuitry that determines available spectrum for a secondary communication system based on a disturbance tolerance of a primary communication system managed by the spectrum management system and interferences of incumbent secondary communication systems managed by the spectrum management system and incumbent secondary communication systems managed by another spectrum management system, and that causes setting of a spectrum for the secondary communication system based on the available spectrum.

BRIEF DESCRIPTION OF THE DRAWINGS

The disclosure may be understood better by referring to description provided in conjunction with the accompanying drawings, wherein the same or similar reference signs are used to represent the same or similar components in all of the figures. The figures and the following detailed description are included in the specification and form a part of the specification, and used to further explain preferable embodiments of the disclosure and explain principle and object of the disclosure by examples. Wherein.

Figure 1:
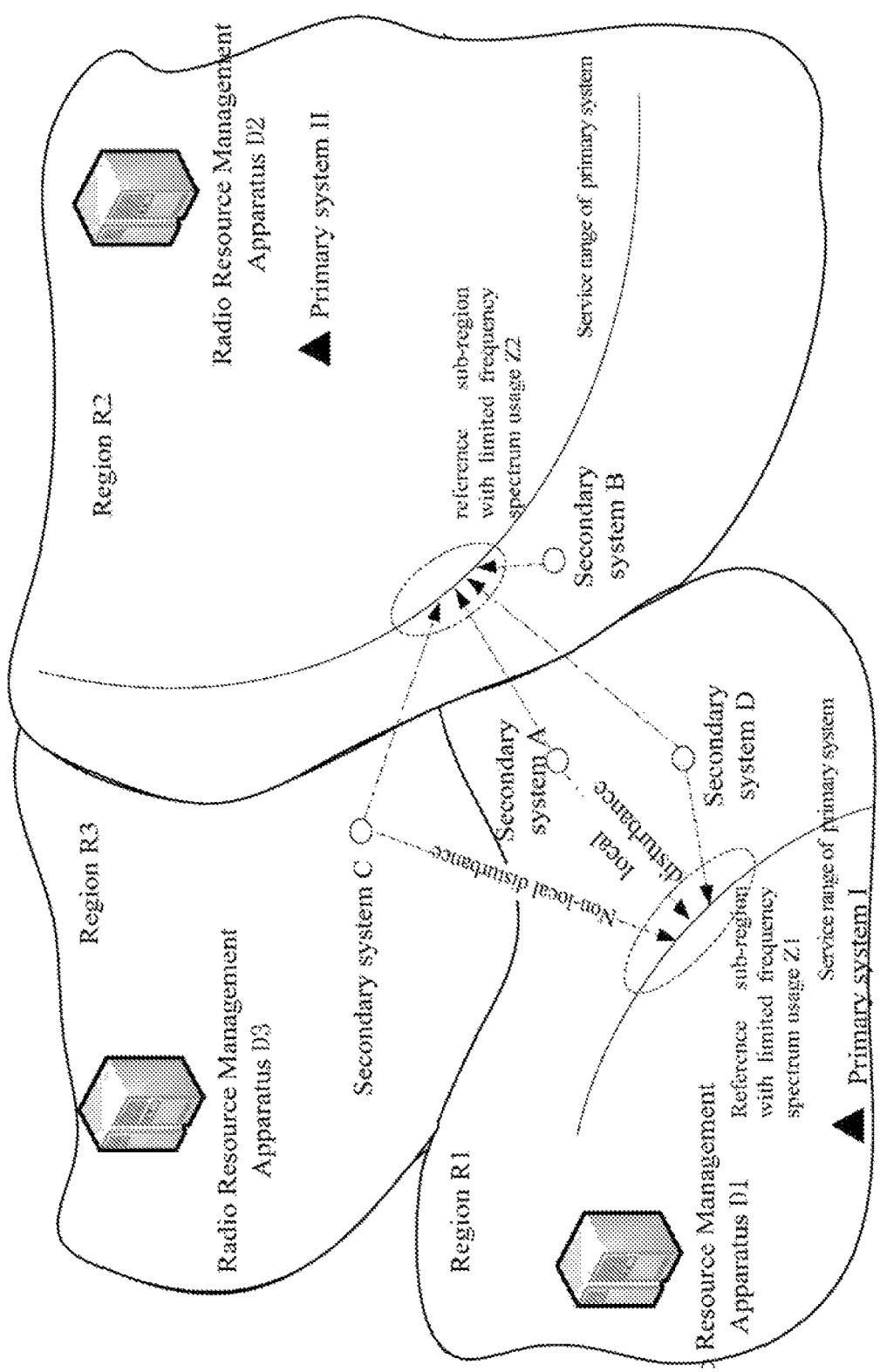
FIG. 1 illustrates a schematic view of an example of a communication system including primary systems and secondary systems.

The skilled person should understand that elements in the figures are illustrated for simplicity and clarity, and are not necessarily drawn to scale. For example, the size of some of the elements in the accompanying drawings may be enlarged with respect to the other elements, so as to facilitate improving the understanding of embodiments of the present disclosure.

DETAILED DESCRIPTION OF THE INVENTION

Exemplary embodiments of the present disclosure will be described hereinafter in conjunction with the accompanying drawings. For the sake of clarity and simplicity, not all the features of an actual implementation are described in the specification. However, it will be appreciated that in the development of any actual embodiment, numerous implementation-specific decisions shall be made in order to achieve the developer's specific goals, such as compliance with system-related and business-related constraints, which may vary from one implementation to another. Moreover, it will be appreciated that such development effort might be very complex and time-consuming, but would nevertheless be a routine undertaking for those skilled in the art having the benefit of the present disclosure.

A point need to be further explained here is that, only those apparatus structures and/or processing steps that are closely related to the technical solutions of the present disclosure are shown in the figures in order to avoid unnecessarily obscuring the present disclosure by unnecessary details, other details that are not closely related to the present invention are omitted.

To fully utilize the limited frequency spectrum resources, a feasible scheme is to dynamically utilize the frequency spectrum resources that have been allocated to certain services but not fully utilized. More specifically, as to primary systems having the right of using frequency spectrum or having a higher priority of using frequency spectrum, the frequency spectrum having not been fully utilized by primary systems is allocated to the secondary system having no right of using frequency spectrum or having a lower priority of using frequency spectrum, so that the secondary system properly use the frequency spectrum of the primary system when the primary system does not use the spectrum it owned, or limit the disturbance on the primary system caused by the secondary system using the frequency spectrum of the primary system to a certain range, thus enabling full utilization of the limited frequency spectrum resources, without influencing usage by the primary system. For example, as to the frequency spectrum allocated to digital television broadcasting, the frequency spectrum of some channels having not been used for programs on digital television broadcasting frequency spectrum or the frequency spectrum on adjacent channels are used for performing wireless communication in wireless communication system such as wireless local area network (WLAN), mobile cellular network, etc., without interfering with receiving television signal. In this application example, since the television broadcasting spectrum itself is allocated to the television broadcasting system for use, the television broadcasting system is the primary system, and the wireless communication system is the secondary system. As another example, both the primary system and the secondary system can be mobile cellular system, but they have different priorities with respect to the use of frequency spectrum, for example, when operators deploy new base stations to provide new services, the existing base stations as well as the provided services have frequency spectrum use priority. The concept of the primary system and the secondary system is well known in the art, which may derive various communication systems as a combination of the primary system and the secondary system with the development of technology, so it will not be described in detail here.

As should be explained, the premise of allocating the frequency spectrum resource of the primary system to the secondary system for use is to meet that the use of frequency spectrum resources by secondary systems will not bring adverse effects to the normal operation of primary systems. Typically, the primary system has a certain tolerance range with respect to the disturbance caused by the secondary system, as long as the disturbance caused by the secondary system does not exceed the upper limit of the disturbance that the primary system can tolerate, the primary system can work as usual, so it need to ensure that the influence caused by the secondary system using the frequency spectrum is controlled within the allowable range of the primary system. In the case that several secondary systems exist, it should be ensured that the aggregate disturbance caused by all secondary systems using the frequency spectrum is within the allowable range of the primary system. Furthermore, in the case that several primary systems exist, with respect to each primary system, it should be ensured that the aggregate disturbance caused by all secondary systems using the frequency spectrum is within the allowable range of the primary system.

FIG. 1 illustrates a schematic view of an example of a communication system comprising primary systems and secondary systems.

The communication system shown in FIG. 1 comprises two primary systems I and II, four secondary systems A, B, C and D, and radio resource management apparatus D1, D2 and D3 for managing primary systems and secondary systems. The service range of secondary system A and primary system I lies in the management region R1 of radio resource management apparatus D1, the service range of secondary system B and primary system II lies in the management region R2 of radio resource management apparatus D2, and secondary system C lies in the management region R3 of radio resource management apparatus D3. The secondary systems A, B, and C are existing secondary systems; the secondary system D is newly added secondary system, which also lies in the service range of primary system I. Usually, a corresponding radio resource management apparatus is provided with respect to a primary system and secondary systems lying in the service range of the primary system, for example, radio resource management apparatus D1 is provided with respect to secondary systems A and D and primary system I, a radio resource management apparatus D2 is provided with respect to secondary system B and primary system II. As to secondary system C, although it does not lie in the service range of primary system I, nor in the service range of primary system II, it brings disturbance to the frequency spectrum use of primary system I and II, so, radio resource management apparatus D3 is provided with respect to secondary system C.

The communication system shown in FIG. 1 is merely an example, those skilled in the art will understand that the number of the primary systems and secondary systems included in the communication system may be different, for example, the communication system includes three or four more primary systems, etc. Furthermore, although an example in which one existing secondary system is provided in the service range of one primary system is shown above, but the present disclosure is not limited thereto, for example, there may be several existing secondary systems in the service range of one primary system, such as two or three existing secondary systems, etc.

In the following, the radio resource management apparatus and corresponding radio resource management method according to embodiments of the present disclosure is described by taking the communication system including two primary systems and three existing secondary systems shown in FIG. 1 as an example.

Figure 2:
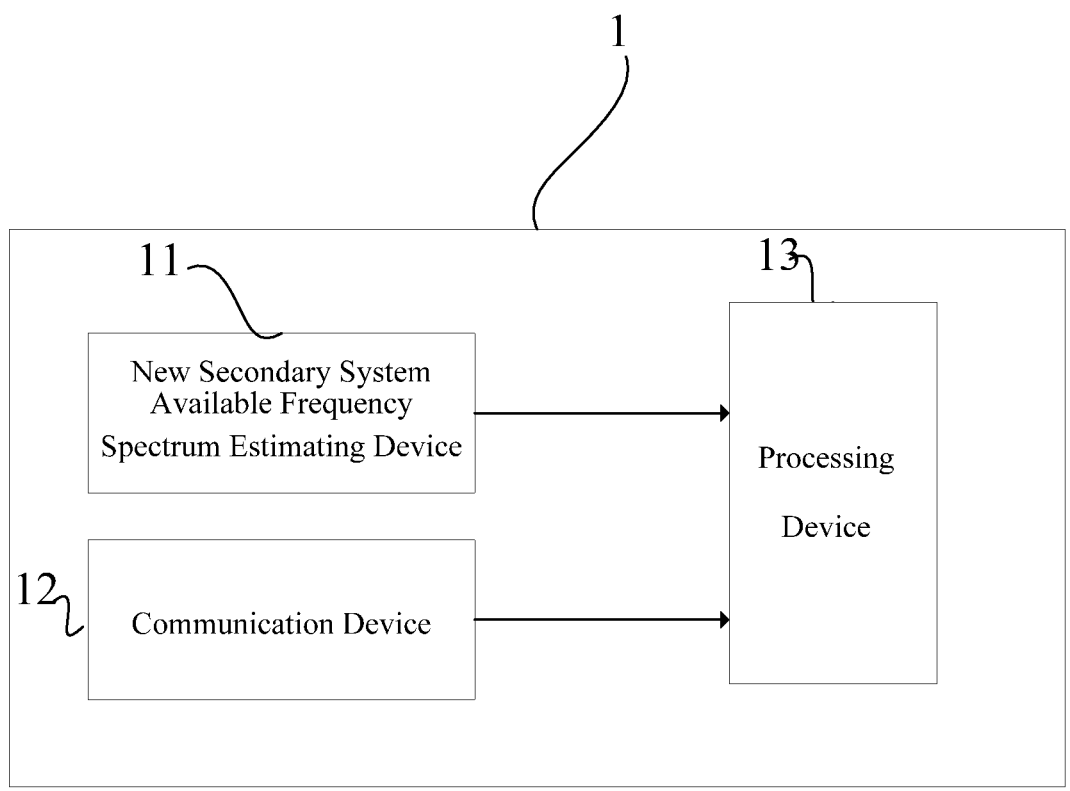
FIG. 2 is a structure block diagram schematically illustrating a radio resource management apparatus according to the first embodiment of the present disclosure.

FIG. 2 is a structure block diagram schematically illustrating a radio resource management apparatus according to the first embodiment of the present disclosure.

As shown in FIG. 2, the radio resource management apparatus 1 according to an embodiment of the present disclosure comprises: a new secondary system available frequency spectrum estimating device 11 configured for determining, with respect to a primary system managed by the radio resource management apparatus 1, a primary system frequency spectrum resource capable of being used by a new secondary system which is newly added and managed by the radio resource management apparatus 1, as a predicted available frequency spectrum for the new secondary system, according to information regarding the primary system, the new secondary system and existing secondary systems; a communication device 12 configured for obtaining predicted available frequency spectrums for the new secondary system determined with respect to each of at least one of other primary systems; and a processing device 13 configured for determining an available frequency spectrum for the new secondary system, according to the predicted available frequency spectrum for the new secondary system obtained by the new secondary system available frequency spectrum estimating device 11 and the predicted available frequency spectrums for the new secondary system obtained by the communication device 12. As should be explained, the new secondary system available frequency spectrum estimating device 11 can be integrally provided in the processing device 13, that is, the function of the new secondary system available frequency spectrum estimating device 11 can be performed by the processing device 13.

The radio resource management apparatus according to the first embodiment of the present disclosure corresponds to the radio resource management apparatus by which the new added secondary system is managed. For example, in the example shown in FIG. 1, the radio resource management apparatus 1 according to the first embodiment of the present disclosure may be the radio resource apparatus D1 shown in FIG. 1 by which the newly added secondary system D is managed. Specifically, the secondary system D may be a secondary system that is provided in advance in the management range of the radio resource management apparatus but in close state, or may be a newly provided secondary system. When a new secondary system is added and wish to use the frequency spectrum resource of the primary system, the new secondary system available frequency spectrum estimating device 11 of the radio resource management apparatus D1 determines a primary system frequency spectrum resource of the primary system I capable of being used by the secondary system D which is newly added and managed by the radio resource management apparatus 1, as a predicted available frequency spectrum for the new secondary system, according to information regarding the primary system I, the secondary system D and existing secondary systems A, B and C. According to an embodiment of the present disclosure, the information regarding the primary system I may include at least one of the information regarding the use of the frequency spectrum resource, the information regarding the anti-disturbance ability and the location information. The information regarding the secondary system D and existing secondary systems A, B and C may include the location information of corresponding secondary system, the information regarding the use of the frequency spectrum resource, and system parameters (including antenna height, transmission template, etc.) and so on. The information regarding the use of the frequency spectrum resource may be transmission power, frequency band for use and bandwidth, etc. Furthermore, the information regarding the use of the frequency spectrum resource may include use time, etc.

According to an embodiment of the present disclosure, the radio resource management apparatus 1 can obtain information regarding the existing secondary system from other radio resource management apparatus or corresponding database, for determining the predicted available frequency spectrum for the new secondary system by the new secondary system available frequency spectrum estimating device 11 of the radio resource management apparatus 1. For example, in the example shown in FIG. 1, the radio resource management apparatus D1 may obtain information regarding the existing secondary systems B from the radio resource management apparatus D2 managing the existing secondary systems B. For another example, in the case that the information regarding the existing secondary systems is stored in a database which uniformly manages the information regarding the existing secondary system, the corresponding information regarding the existing secondary system may also be obtained from the database.

Figure 3:
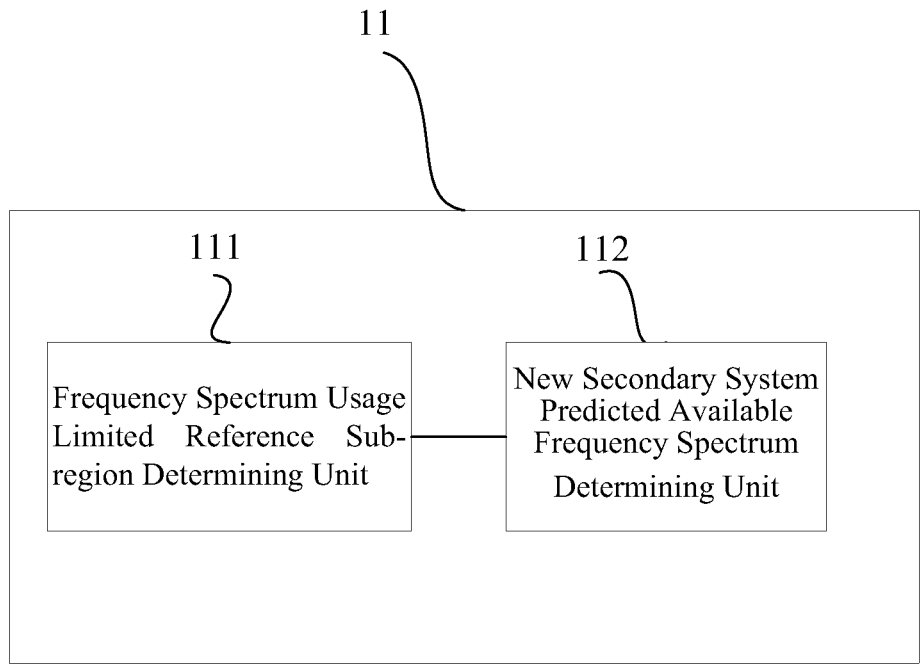
FIG. 3 is a schematic view illustrating an exemplary configuration of a new secondary system predicted available frequency spectrum determining device shown in FIG. 2.

FIG. 3 is a schematic view illustrating an implementation of the new secondary system available frequency spectrum estimating device 11 shown in FIG. 2.

As shown in FIG. 3, the new secondary system available frequency spectrum estimating device comprises: a frequency spectrum usage limited reference sub-region determining unit 111 configured for determining, with respect to the primary system managed by the radio resource management apparatus 1, a reference sub-region with limited frequency spectrum usage for a new secondary system which is newly added and managed by the radio resource management apparatus 1, according to the using condition of the frequency spectrum of the primary system and the information regarding the new secondary system; and a new secondary system predicted available frequency spectrum determining unit 112 configured for determining, with respect to the reference sub-region with limited frequency spectrum usage, a primary system frequency spectrum capable of being used by the new secondary system, as the predicted available frequency spectrum for the new secondary system, according to the disturbance of the existing secondary system on the reference sub-region with limited frequency spectrum usage.

According to an embodiment of the present disclosure, the reference sub-region with limited frequency spectrum usage for the secondary system can be determined from the information regarding the transmission power of the new secondary system and the location of the secondary system, etc. For example, the region in which the edge of the service region of the primary system is the nearest to the new secondary system can be determined as the reference sub-region with limited frequency spectrum usage, or a certain region which is disturbed most seriously by the new secondary system in the coverage range of the primary system can be determined as the reference sub-region with limited frequency spectrum usage, and so on. Those skilled in the art will appreciate the concept of the reference sub-region with limited frequency spectrum usage and the determining method thereof from the description of the reference sub-region with limited frequency spectrum usage in the present invention, and the more detailed description is omitted here. For example, in the example shown in FIG. 1, the reference sub-region with limited frequency spectrum usage Z1 is determined with respect to the primary system I and the reference sub-region with limited frequency spectrum usage Z2 is determined with respect to the primary system II.

After the reference sub-region with limited frequency spectrum usage is determined with respect to the primary system, the predicted available frequency spectrum for the new secondary system is determined by the new secondary system predicted available frequency spectrum determining unit 112.

As shown in FIG. 3, the new secondary system predicted available frequency spectrum determining unit 112 determines, with respect to the reference sub-region with limited frequency spectrum usage, a primary system frequency spectrum capable of being used by the new secondary system, as the predicted available frequency spectrum for the new secondary system, according to the disturbance of the existing secondary system on the reference sub-region with limited frequency spectrum usage.

Figure 4:
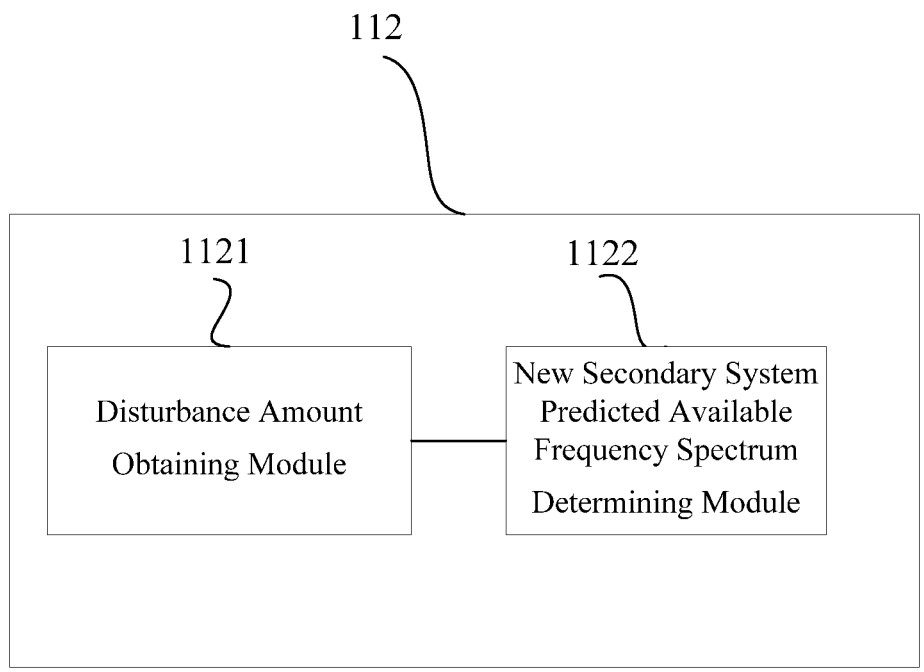
FIG. 4 is a schematic view illustrating an exemplary configuration of a new secondary system predicted available frequency spectrum determining unit shown in FIG. 3.

FIG. 4 is a schematic view illustrating an implementation of the new secondary system predicted available frequency spectrum determining unit 112 shown in FIG. 3.

As shown in FIG. 4, the new secondary system predicted available frequency spectrum determining unit 112 comprises a disturbance amount obtaining module 1121 and a new secondary system predicted available frequency spectrum determining module 1122.

The disturbance amount obtaining module 1121 determines a maximum disturbance amount allowed to be generated when the new secondary system is using the frequency spectrum of the primary system managed by the radio resource management apparatus, according to the difference between the disturbance upper limit allowed by the primary system and the disturbance amount of the existing secondary systems on the reference sub-region with limited frequency spectrum usage. For example, as a specified example, when the disturbance on the reference sub-region with limited frequency spectrum usage caused by the existing secondary systems reaches the disturbance upper limit allowed by the primary system, the disturbance amount obtaining module can determine the maximum disturbance amount allowed to be generated, when the new secondary system is using the frequency spectrum of the primary system, as zero.

As should be explained here, when there are several existing secondary systems that bring disturbance to the reference sub-region with limited frequency spectrum usage, the disturbance amount of the existing secondary systems on the reference sub-region with limited frequency spectrum usage refers to the aggregate disturbance of several existing secondary systems.

The new secondary system predicted available frequency spectrum determining module 1122 determines with respect to the reference sub-region with limited frequency spectrum usage, the frequency spectrum of the primary system that can be used by the new secondary system as the predicted available frequency spectrum for the new secondary system, according to the maximum disturbance amount allowed to be generated determined by the disturbance amount obtaining module 1121.

According to an embodiment of the present disclosure, for example, the predicted available frequency spectrum for the new secondary system can be calculated from the determined maximum disturbance amount, the distance between the reference sub-region with limited frequency spectrum usage and the secondary system, and the secondary system path loss over the distance, etc. For example, the concrete calculation method may be referred to various methods recorded in CEPT, 'Draft of ECC report: Technical and operational requirements for the operation of white space devices under geo-location approach,' ECC186, Aug. 2012.

In the specified example in which the maximum disturbance amount is determined to be zero, the predicted available frequency spectrum for the new secondary system is determined to be zero correspondingly.

It will be understood by those skilled in the art that the predicted available frequency spectrum for the new secondary system determined by the new secondary system predicted available frequency spectrum determining module 1122 may be either the maximum predicted available frequency spectrum for the new secondary system that corresponds to the maximum disturbance amount determined by the disturbance amount obtaining module 1121 and could be used by the new secondary system without disturbing the normal operation of the primary system, or the predicted available frequency spectrum for the new secondary system smaller than the maximum predicted available frequency spectrum for the new secondary system.

When the disturbance of the secondary system on the primary system is determined, it can be considered that the aggregate disturbance caused by all secondary systems is within the allowable range of the primary system, as long as the disturbance brought to the determined reference sub-region with limited frequency spectrum usage by all secondary systems is within the allowable range, therefore, the new secondary system available frequency spectrum estimating device 11 according to an embodiment of the present disclosure uses the reference sub-region with limited frequency spectrum usage to determine the predicted available frequency spectrum for the new secondary system, thus to realize determining the predicted available frequency spectrum for the new secondary system by simple and accurate methods.

However, using the reference sub-region with limited frequency spectrum usage to determine the predicted available frequency spectrum for the new secondary system as mentioned above is just an example, it will be understood by those skilled in the art that other configurations can be adopted for the new secondary system available frequency spectrum estimating device 11 to determine the predicted available frequency spectrum for the new secondary system. For example, the new secondary system available frequency spectrum estimating device 11 can be configured to comprise a unit that respectively calculates the predicted available frequency spectrum for the new secondary system with respect to the disturbance of the existing secondary systems in several area within the coverage range of the primary system, and a unit that calculates the average value of the predicted available frequency spectrum for several new secondary systems with respect to several regions as the final predicted available frequency spectrum for the new secondary system.

Furthermore, according to an embodiment of the present disclosure, the new secondary system available frequency spectrum estimating device 11 can be configured to represent the disturbance of the existing secondary systems on the determined reference sub-region with limited frequency spectrum usage in the form of disturbance source and disturbance amount. Through checking the frequency spectrum using condition of the secondary systems managed by the radio resource management apparatus 1 and other radio resource management apparatus, the new secondary system available frequency spectrum estimating device 11 can calculate the disturbance amount of the existing secondary systems on the determined reference sub-region with limited frequency spectrum usage according to the transmission path loss.

Table 1 shows the composition of existing disturbance on the reference sub-region with limited frequency spectrum usage Z1 of the new secondary system D determined with respect to the primary system I shown in FIG. 1.

TABLE 1

|  | Local disturbance | Non-local disturbance |
|---|---|---|
| Disturbance ID | Secondary system base station A | Secondary system base station C |
| Disturbance amount | 5 dBm | 2 dBm |

As shown in table 1, as to the reference sub-region with limited frequency spectrum usage, the disturbance is composed by two parts: one part is from the secondary system that lies in the same service range of the primary system together with the new secondary system and is referred to as local disturbance; the other part is from the secondary system that lies in serve ranges of other primary system and is referred to as non-local disturbance. Specifically, as to the reference sub-region with limited frequency spectrum usage Z1 shown in FIG. 1, the disturbance of the existing secondary system A within the service range of the primary system I is local disturbance, the disturbance amount is 5 dBm; and the disturbance of the existing secondary system C is non-local disturbance, the disturbance amount is 2 dBm. As should be explained here, in the case that the existing secondary system B does not bring disturbance to the reference sub-region with limited frequency spectrum usage Z1 because of factors such as the transmission power of the existing secondary system B is low, the transmission path is long, etc. (namely, the disturbance amount is zero), table 1 may not include disturbance information of the existing secondary system B.

According an embodiment of the present disclosure, each of the information regarding local disturbance and the information regarding non-local disturbance may include information regarding the disturbance source identification (disturbance source ID) and the disturbance amount. The disturbance source ID comprises the radio management apparatus ID responsible for managing the disturbance source and the secondary system apparatus ID, furthermore, the disturbance resource ID may include the secondary system transmission parameter ID (such as air interface ID). Table 2 shows exemplary composition of the disturbance resource ID, as shown in table 2, the disturbance resource ID is composed of the radio management apparatus ID responsible for managing the disturbance resource, the secondary system apparatus ID and the secondary system transmission parameter ID (such as air interface ID), etc.

TABLE 2

| Radio management apparatus ID | Secondary system apparatus ID | Secondary system transmission parameter ID | Preserved region |
|---|---|---|---|

The disturbance amount may be either the disturbance amount of the existing secondary system on a certain point in the service region of the primary system, or the average value of the disturbance of the existing secondary system on a certain region, or a statistic value at a certain probability. When the disturbance source is several secondary systems, the disturbance amount is the aggregate disturbance of the several secondary systems on a certain point or a certain region in the service region of the primary system.

Returning to FIG. 2, the communication device 12 of the radio resource management apparatus 1 is configured for obtaining the predicted available frequency spectrum for the new secondary system determined with respect to each of at least one of other primary systems. The predicted available frequency spectrum for the new secondary system determined with respect to each of other primary systems is calculated by other radio resource management apparatus and sent to the radio resource management apparatus 1. For example, in the example shown in FIG. 1, the communication device 12 obtains the predicted available frequency spectrum P2 for the new secondary system of the new secondary system D determined with respect to the primary system II, and the predicted available frequency spectrum for the new secondary system P2 is calculated by the radio resource management apparatus D2 and sent to the radio resource management apparatus D1. For example, similar to the radio resource management apparatus D1, the radio resource management apparatus D2 may be configured with a new secondary system available frequency spectrum estimating device 21 (described later).

In addition to the new secondary system predicted available frequency spectrum of the new secondary system determined with respect to each of at least one of other primary systems, the communication device 12 of the radio resource management apparatus 1 is further configured to obtain the information regarding reference sub-regions with limited frequency spectrum usage of the new secondary system determined with respect to each of at least one of other primary systems, and the information regarding the disturbance of the existing secondary systems on respective reference sub-region with limited frequency spectrum usage. Obtaining the information regarding the reference sub-region with limited frequency spectrum usage and the information regarding the disturbance of the existing secondary systems on respective reference sub-region with limited frequency spectrum usage is similar to the operation performed by the frequency spectrum usage limited reference sub-region determining unit 111 and the new secondary system predicted available frequency spectrum determining unit 112 (described by referring to FIGS. 3 and 4), and it is not repeated here.

In addition, similar to the composition of the disturbance information described in conjunction with Table 1, the disturbance information, obtained by the communication device 12, regarding the reference sub-region with limited frequency spectrum usage that is determined with respect to each of at least one of other primary systems by the existing secondary system includes local disturbance information and non-local disturbance information, and each of the local disturbance information and non-local disturbance information comprises information regarding identifications of disturbance sources and disturbance amounts.

As shown in FIG. 2, after the new secondary system available frequency spectrum estimating device 11 has determined the predicted available frequency spectrum for the new system with respect to the primary system and the communication device has obtained the predicted available frequency spectrum for the new secondary system with respect to other primary systems, the processing device 13 determines the available frequency spectrum for the new secondary system according to the predicted available frequency spectrum for the new secondary system obtained by the new secondary system available frequency spectrum estimating device 11 and the predicted available frequency spectrums for the new secondary system obtained by the communication device 12.

According to an embodiment of the present disclosure, when the processing device 13 obtains respective predicted available frequency spectrums for the new system from the new secondary system available frequency spectrum estimating device 11 and the communication device 12, the processing device 13 can sort all predicted available frequency spectrum for the new secondary system in a descending order, and determines the smallest predicted available frequency spectrum for the new secondary system as the available frequency spectrum for the new secondary system, so that the determined available frequency spectrum for the new secondary system satisfies the disturbance restrictions of all primary systems, that is, the influence on applications of all primary systems caused by the new secondary system using frequency spectrum of the primary system is within the allowable range. This particularly applies to the case that the new secondary system does not have expected using frequency spectrum.

As to the case that the new secondary system has an expecting usable frequency spectrum, in this case, the communication device 12 is further configured to obtain the information regarding the expected using frequency spectrum for the new secondary system, and the processing device 13 is further configured to determine making an adjustment to the frequency spectrums used by existing secondary systems according to the relationship between the expected using frequency spectrum for the new secondary system and each of the predicted available frequency spectrums for the new secondary system, so that the available frequency spectrum for the new secondary system corresponds to its expecting usable frequency spectrum.

More specifically, if the expected using frequency spectrum for the new secondary system is smaller than the smallest predicted available frequency spectrum for the new secondary system among all the predicted available frequency spectrums for the new secondary system, the processing device 13 can determine making no adjustment to the frequency spectrums used by existing secondary systems, and determine the expected using frequency spectrum for the new secondary system as the available frequency spectrum for the new secondary system.

If the expected using frequency spectrum for the new secondary system is bigger than at least one of all predicted available frequency spectrums for the new secondary system, the processing device 13 can determine making an adjustment to the frequency spectrums used by existing secondary systems, so that the available frequency spectrum for the new secondary system corresponds to its expecting usable frequency spectrum.

Figure 5:
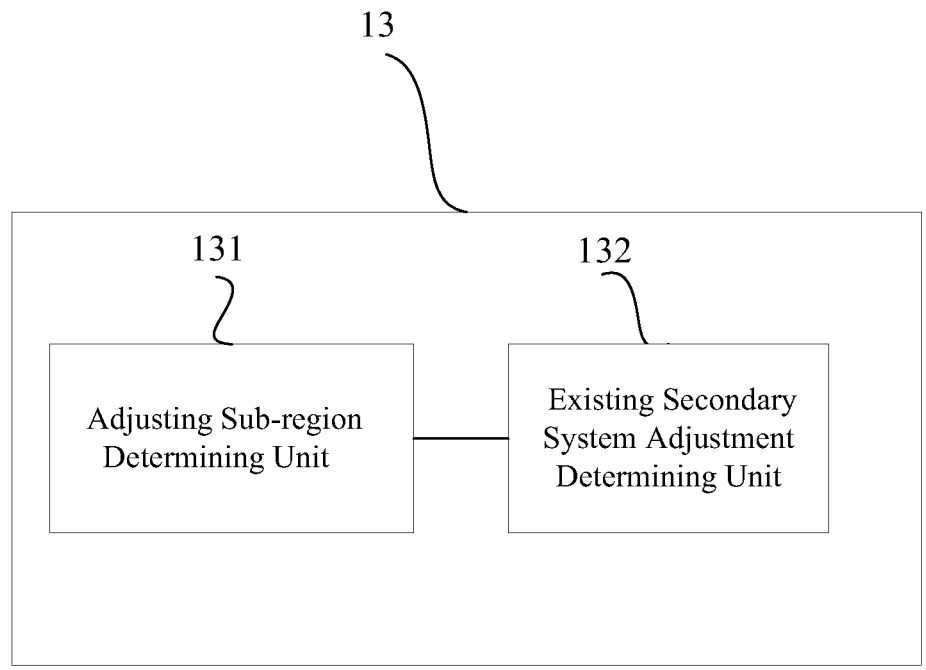
FIG. 5 is a schematic view illustrating an exemplary configuration of a processing device shown in FIG. 2.

FIG. 5 is a schematic view illustrating an implementation of the processing device 13 shown in FIG. 2.

As shown in FIG. 5, the processing device 13 includes: an adjusting sub-region determining unit 131, configured for determining reference sub-regions with limited frequency spectrum usage that need to be adjusted, among the reference sub-region with limited frequency spectrum usage determined with respect to the primary system managed by the radio resource management apparatus and the reference sub-regions with limited frequency spectrum usage determined with respect to each of the at least one of other primary systems, according to the relationship between the expecting usable frequency spectrum for the new secondary system and each of the predicted available spectrums for the new secondary system; and an existing secondary system adjustment determining unit 132, configured for determining the adjustment to the frequency spectrums used by the existing secondary system according to the determined reference sub-regions with limited frequency spectrum usage that need to be adjusted.

According to a preferred embodiment of the present disclosure, for example, the adjusting sub-region determining unit 131 can determine the following reference sub-regions with limited frequency spectrum usage as the reference sub-regions with limited frequency spectrum usage that need to be adjusted: the predicted available frequency spectrum for the new secondary system determined with respect to the reference sub-region with limited frequency spectrum usage is smaller than the expected using frequency spectrum for the new secondary system.

For example, in the example shown in FIG. 1, with respect to the primary system I, the determined newly added secondary system D has a predicted available frequency spectrum for the new secondary system P1=20 dBm, with respect to the primary system II, the determined newly added secondary system D has a predicted available frequency spectrum for the new secondary system P2=30 dBm, and in the case that the new secondary system D has a expected using frequency spectrum PE=28 dBm, it can be determined that the reference sub-region with limited frequency spectrum usage with respect to the primary system I is the reference sub-region with limited frequency spectrum usage that needs to be adjusted. Since the predicted available frequency spectrum for the new secondary system determined with respect to the primary system II is larger than the expected using frequency spectrum for the new secondary system D, it is not necessary to adjust the reference sub-region with limited frequency spectrum usage of the primary system II.

When the reference sub-regions with limited frequency spectrum usage that need to be adjusted are determined, the existing secondary system adjustment determining unit 132 determines to adjust the frequency spectrum used by the existing secondary system with respect to the reference sub-regions with limited frequency spectrum usage determined as needing to be adjusted.

According to a preferred embodiment of the present disclosure, the existing secondary system adjustment determining unit 132 is configured to determine, with respect to each of the reference sub-regions with limited frequency spectrum usage that need to be adjusted, existing secondary systems whose frequency spectrum usage needs to be adjusted and the frequency spectrum usage adjusting amount thereof, according to frequency spectrum using priorities.

For example, the frequency spectrum using priorities of existing secondary systems can be determined from the paid fees for the occupied frequency spectrum, the network capability of respective secondary system, the proportion of the number of users served by the system, the location of respective secondary system relative to the reference sub-region with limited frequency spectrum usage, and so on. For example, according to an embodiment of the present disclosure, the existing secondary system having a frequency spectrum using priority lower than the predetermined threshold may be determined as the existing secondary system whose frequency spectrum usage needs to be adjusted, and the existing secondary system having a frequency spectrum using priority higher than the predetermined threshold may be determined as the existing secondary system whose frequency spectrum usage needs not to be adjusted.

It will be appreciated by those skilled in the art that, with respect to different reference sub-regions with limited frequency spectrum usage, same existing secondary system may have same frequency spectrum using priority or different frequency spectrum using priority.

Figure 6:
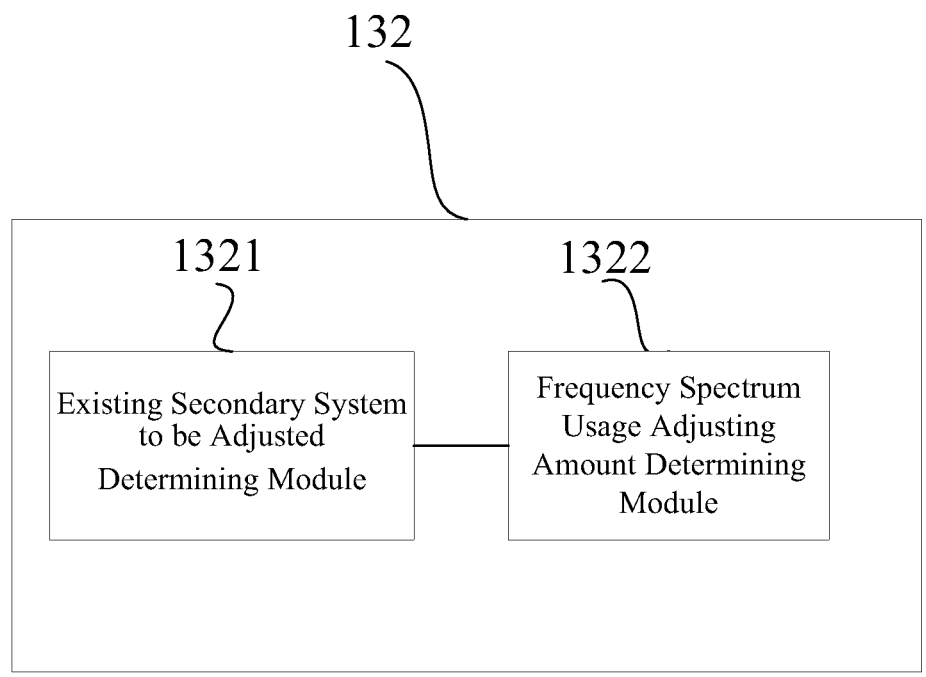
FIG. 6 is a block diagram illustrating an exemplary configuration of an existing secondary system adjustment determining unit shown in FIG. 5.

FIG. 6 is a block diagram illustrating an exemplary configuration of an existing secondary system adjustment determining unit 132 shown in FIG. 5.

The existing secondary system adjustment determining unit 132 comprises: an existing secondary system to be adjusted determining module 1321, configured for determining, with respect to each of the reference sub-regions with limited frequency spectrum usage that need to be adjusted, existing secondary systems to be adjusted whose frequency spectrum usage need to be adjusted, according to the frequency spectrum using priorities of each secondary system; and a frequency spectrum usage adjusting amount determining module 1322, configured for determining the frequency spectrum usage adjusting amounts of respective existing secondary systems that need to be adjusted, so as to satisfy the following secondary system frequency spectrum adjusting conditions with respect to each of the reference sub-regions with limited frequency spectrum usage: for respective existing secondary systems to be adjusted that generate disturbance on the reference sub-region with limited frequency spectrum usage, the sum of the determined frequency spectrum usage adjusting amounts is equal to or larger than the difference between the expecting useable frequency for the new secondary system and the predicted available frequency spectrum for the new secondary system with respect to the reference sub-region with limited frequency spectrum usage.

According to an embodiment of the present disclosure, since there are several primary systems and regions covered by primary systems, and different existing secondary systems lie in different regions covered by primary systems, for giving consideration of both the reasonability and justness of the frequency spectrum usage, the existing secondary system to be adjusted determining module 1321 is preferably configured to:

With respect to each of the reference sub-regions with limited frequency spectrum usage that need to be adjusted, if the new secondary system and the reference sub-region with limited frequency spectrum usage are located in the region managed by the same radio resource management apparatus, that is, the new secondary system brings local disturbance on the reference sub-regions with limited frequency spectrum usage, the priorities of all existing secondary systems that bring disturbance to the reference sub-regions with limited frequency spectrum usage are set to be lower than predetermined threshold, thus to determine all existing secondary systems as existing secondary systems to be adjusted whose frequency spectrum usage need to be adjusted.

On the other hand, if the new secondary system and the reference sub-region with limited frequency spectrum usage are located in regions managed by different radio resource management apparatus, that is, the new secondary system brings non-local disturbance on the reference sub-regions with limited frequency spectrum usage, the priorities of existing secondary systems that are located in the region managed by the same radio resource management apparatus with the reference sub-region with limited frequency spectrum usage (namely, the existing secondary systems that bring local disturbance to the reference sub-regions with limited frequency spectrum usage) are set to higher than predetermined threshold, thus to determine the existing secondary systems as existing secondary systems whose frequency spectrum usage need not to be adjusted, and the priorities of other existing secondary systems that bring disturbance to the reference sub-region with limited frequency spectrum usage (namely, the existing secondary systems that bring non-local disturbance to the reference sub-regions with limited frequency spectrum usage) except the existing secondary systems that are located in the region managed by the same radio resource management apparatus with the reference sub-region with limited frequency spectrum usage are set to low, so as to determine the existing secondary systems as existing secondary systems to be adjusted whose frequency spectrum usage need to be adjusted. When several secondary systems have same priorities, the priorities can be further divided among these secondary systems having same priorities, so to determine the secondary systems needing to have the frequency spectrum usage adjusted to accommodate new secondary systems.

That is, with respect to each reference sub-region with limited frequency spectrum usage, if the disturbance brought by the newly added secondary system to the sub-region is local disturbance, the new secondary system has a right to require the existing secondary systems that generate local disturbance and non-local disturbance to lower the frequency spectrum usage, so as to accommodate the usage of the frequency spectrum resource of the primary system by the new secondary system; if the disturbance brought by the newly added secondary system to the reference sub-region with limited frequency spectrum usage is non-local disturbance, the new secondary system has a right to require the existing secondary systems that generate non-local disturbance to lower the frequency spectrum usage, but can not require the existing secondary systems that generate local disturbance to lower the frequency spectrum usage.

For example, in the example shown in FIG. 1, the frequency spectrum usage of the new secondary system D is limited by the reference sub-region with limited frequency spectrum usage Z1 and Z2, with respect to the reference sub-region with limited frequency spectrum usage Z1, since the disturbance generated by the new secondary system D is local disturbance, all of the existing secondary systems A, B, C that brings disturbance (including local disturbance and non-local disturbance) to the reference sub-region with limited frequency spectrum usage Z1 can be determined as the existing secondary systems to be adjusted whose frequency spectrum usage need to be adjusted; with respect to the reference sub-region with limited frequency spectrum usage Z2, since the disturbance generated by the new secondary system D is non-local disturbance, only the existing secondary systems A and C that bring non-local disturbance to the reference sub-region with limited frequency spectrum usage Z2 are determined as the existing secondary systems to be adjusted whose frequency spectrum usage need to be adjusted.

When the existing secondary system to be adjusted determining module 1321 has determined the existing secondary systems to be adjusted whose frequency spectrum usage need to be adjusted with respect to each of reference sub-region with limited frequency spectrum usage that needs to be adjusted, the frequency spectrum usage adjusting amount determining module 1322 determines the frequency spectrum usage adjusting amount for respective existing secondary systems to be adjusted, so as to satisfy the following secondary system frequency spectrum adjusting condition for each of the reference sub-regions with limited frequency spectrum usage: for respective existing secondary systems to be adjusted that generate disturbance on the reference sub-region with limited frequency spectrum usage, the sum of the determined frequency spectrum usage adjusting amounts is equal to or larger than the difference between the expecting useable frequency for the new secondary system and the predicted available frequency spectrum for the new secondary system with respect to the reference sub-region with limited frequency spectrum usage.

Specifically, the frequency spectrum adjusting condition for the secondary system with respect to each of the reference sub-regions with limited frequency spectrum usage can be represented by the following formulas:

$$x\_1,1 + x\_2,1 + \ldots + x\_k1,1 > \Delta 1 \quad (1)$$

$$x\_1,2 + x\_2,2 + \ldots + x\_k2,2 > \Delta 2 \quad (2)$$

$$\vdots$$

$$x\_1,m + x\_2,m + \ldots + x\_km,m > \Delta m \quad (m)$$

wherein, inequality (1) denotes the frequency spectrum adjusting condition for the secondary system with respect to the first reference sub-region with limited frequency spectrum usage that needs to be adjusted; formula (m) denotes the frequency spectrum adjusting condition for the secondary system with respect to the m-th reference sub-region with limited frequency spectrum usage that needs to be adjusted; km represents the number of existing secondary systems to be adjusted determined in the m-th reference sub-region with limited frequency spectrum usage, and x_1,m represents the adjusting amount for the first existing secondary system to be adjusted with respect to the m-th reference sub-region with limited frequency spectrum usage; x_km,m represents the adjusting amount for the km-th existing secondary system to be adjusted with respect to the m-th reference sub-region with limited frequency spectrum usage, $\Delta m$ represents the difference between the expecting useable frequency for the new secondary system and the predicted available frequency spectrum for the new secondary system with respect to the m-th reference sub-region with limited frequency spectrum usage.

The frequency spectrum usage adjusting amount for the existing secondary system to be adjusted that satisfies all of the above inequalities can be obtained by solving the above set of inequalities.

According to a preferred embodiment of the present disclosure, the proportion of the frequency spectrum adjusting amounts for each of the existing secondary systems to be adjusted is determined with respect to each of reference sub-regions with limited frequency spectrum usage before solving the above inequalities set, so to facilitate making solution.

According to an embodiment of the present disclosure, for example, the frequency spectrum usage adjusting amount for each of the existing secondary systems to be adjusted can be determined in a way of making same adjustment to all existing secondary systems to be adjusted, that is, making the adjusting amount for each of the existing secondary systems to be adjust satisfy the following formula (4):

$$x\_1,m = x\_2,m = \ldots = x\_km,m \quad (4)$$

According to another embodiment of the present disclosure, the frequency spectrum usage adjusting amount determining module 1322 is further configured to determine the frequency spectrum usage adjusting amount for respective existing secondary systems to be adjusted with respect to respective reference sub-regions with limited frequency spectrum usage that need to be adjusted, by using the proportion between the disturbance amounts of respective existing secondary systems to be adjusted on the reference sub-region with limited frequency spectrum usage. For example, in the example described in conjunction with Table 1, with respect to the reference sub-region with limited frequency spectrum usage Z1, when the disturbance amount of existing secondary system A on the sub-region is 5 dBm and the disturbance amount of existing secondary system C on the sub-region Z2 is 2 dBm, the proportion between the frequency spectrum usage adjusting amounts of existing secondary system A and existing secondary system C is determined as $10^{(5/10)}:10^{(2/10)}=2:1$.

As should be explained here, in order to facilitate the calculation, the rules for determining the proportion between the adjusting amounts of existing secondary systems to be adjusted with respect to respective reference sub-regions with limited frequency spectrum usage should be consistent.

When the proportion between the adjusting amounts of existing secondary systems is determined with respect to respective existing secondary systems to be adjusted, the frequency spectrum usage adjusting amount determining module 1322 is further configured to sequentially determine the frequency spectrum usage adjusting amount of respective existing secondary systems to be adjusted for each of the reference sub-regions with limited frequency spectrum usage that need to be adjusted, among all determined reference sub-regions with limited frequency spectrum usage that need to be adjusted, in a descending order with respect to the difference between the expected using frequency spectrum for the new secondary system and the new secondary system predicted available frequency spectrum for reference sub-region with limited frequency spectrum usage, so as to satisfy the secondary system frequency spectrum adjusting conditions for each of the reference sub-regions with limited frequency spectrum usage.

Specifically, the frequency spectrum usage adjusting amount determining module 1322 can sequentially solve each inequality in above set of inequalities in a descending order with respect to $\Delta 1, \ldots, \Delta m$. After having made solution with respect to one reference sub-region with limited frequency spectrum usage, other reference sub-regions with limited frequency spectrum usage are checked if there is a need to make solution, that is, if all parameters of above formulas with respect to other reference sub-regions with limited frequency spectrum usage have been solved. When a certain variable having been solved is present in an inequality having not been solved, the variable is not solved again, and is deemed as a known quantity. when certain inequalities are satisfied according to existing solved variables, the frequency spectrum usage adjusting amount of the existing secondary systems to be adjusted are not solved again with respect to corresponding reference sub-regions with limited frequency spectrum usage. When there is no variable that has not been solved and the variable that has been solved does not satisfy the inequality, modification is made to the frequency spectrum usage adjusting amount of the existing secondary systems to be adjusted that have been determined.

Since certain existing secondary systems will bring disturbance to several reference sub-regions with limited frequency spectrum usage, the number of solving inequalities can be reduced to the maximum degree by determining the frequency spectrum usage adjusting amounts of respective existing secondary systems to be adjusted in above sequence and fashion, the number of existing secondary systems to be adjusted is reduced, and the information interaction between the frequency spectrum management device for managing the existing secondary systems and the existing system is also reduced.

Figure 7:
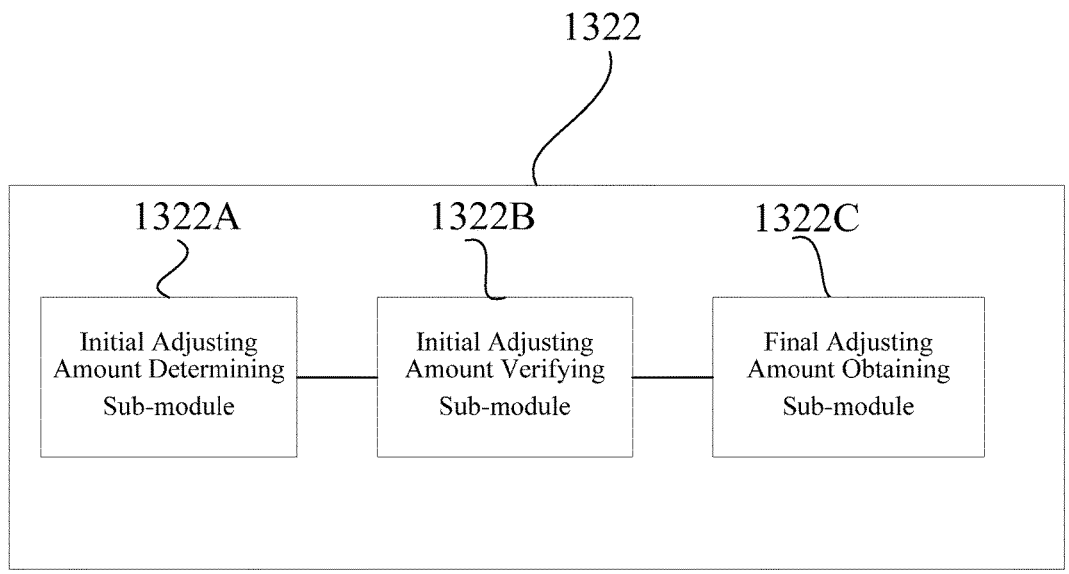
FIG. 7 is a block diagram illustrating an exemplary configuration of a frequency spectrum usage adjusting amount determining module shown in FIG. 6.

FIG. 7 is a block diagram illustrating an exemplary configuration of a frequency spectrum usage adjusting amount determining module 1322 shown in FIG. 6.

As shown in FIG. 7, the frequency spectrum usage adjusting amount determining module 1322 comprises: an initial adjusting amount obtaining sub-module 1322A, an initial adjusting amount verifying sub-module 1322B, and a final adjusting amount obtaining sub-module 1322C.

When the frequency spectrum usage adjusting amount of respective existing secondary systems to be adjusted have been determined with respect to respective reference sub-regions with limited frequency spectrum usage that need to be adjusted, the initial adjusting amount obtaining sub-module 1322A takes the frequency spectrum usage adjusting amounts as an initial frequency spectrum usage adjusting amounts.

The initial adjusting amount verifying sub-module 1322B verifies if the initial frequency spectrum usage adjusting amounts satisfy the secondary system frequency spectrum adjusting conditions of other reference sub-regions with limited frequency spectrum usage by using the initial frequency spectrum usage adjusting amount.

In the case that the verifying result of the initial adjusting amount verifying sub-module is positive, the final adjusting amount obtaining sub-module 1322C takes the initial frequency spectrum usage adjusting amount as the final frequency spectrum usage adjusting amount for performing adjustment to the frequency spectrum usage of respective existing secondary system to be adjusted, and in the case that the verifying result of the initial adjusting amount verifying sub-module is negative, the final adjusting amount obtaining sub-module 1322C performs modification to the initial frequency spectrum usage adjusting amount so that the frequency spectrum usage adjusting amounts that have been modified satisfy the secondary system frequency spectrum adjustment condition of all reference sub-regions with limited frequency spectrum usage, and takes the frequency spectrum usage adjusting amounts that have been modified as the final frequency spectrum usage adjusting amount for performing adjustment to the frequency spectrum usage of respective existing secondary system to be adjusted. When the final frequency spectrum usage adjusting amount is determined, the radio resource management apparatus can send the determined frequency spectrum usage adjusting amount to other radio resource management apparatus, for the other radio resource management apparatus to perform adjustment to the frequency spectrum usage of the existing secondary systems that are managed by the other radio resource management apparatus, using the frequency spectrum usage adjusting amount.

When the available frequency spectrum for the new secondary system is determined by the processing device 13 of the radio resource management apparatus 1, the radio resource management apparatus 1 can send the determined available frequency spectrum for the new secondary system to the new secondary system, and the new secondary system can perform communication according to the available frequency spectrum after receiving the available frequency spectrum that is determined by the radio resource management apparatus. Furthermore, the radio resource management apparatus can send the determined available frequency spectrum for the new secondary system to either, for example, the database that uniformly manages information regarding the secondary systems, or the other radio resource management apparatus, especially the radio resource management apparatus that is affected by the new secondary system.

According to a preferred embodiment of the present disclosure, the primary system managed by the radio resource management apparatus 1 and said at least one of other primary systems can lie in different regions, wherein, the frequency spectrum resource usage information regarding the primary system can not be share among respective regions. As should be explained here, as to the same region, the usage information among the primary systems therein can only be partially shared.

For example, in the example shown in FIG. 1, the primary system I, the secondary system A and the new secondary system D in the coverage region of the primary system I lie in region R1; the primary system II and the secondary system B in the coverage region of the primary system I lie in region R2; and the primary system III and the secondary system C in the coverage region of the primary system III lie in region R3.

Of cause, those skilled in the art will understand that, as to a region defined as above, more than two primary systems can be included in one region.

In addition, in order to save resources, the radio resource management apparatus according to the present disclosure can be provided with respect to each region, that is, one radio resource management apparatus according to the present disclosure can be provided in one region for managing the secondary systems in the region. When several primary systems are included in one region, the radio resource management apparatus according to the present disclosure can determine the predicted available frequency spectrum for the new secondary system with respect to each primary systems in the region that is managed by the radio resource management apparatus, the specific way for determining is similar to the way by which the new secondary system available frequency spectrum estimating device determines the predicted available frequency spectrum for the new secondary system described in conjunction with FIGS. 2-4, and it is not repeated here.

Figure 8:
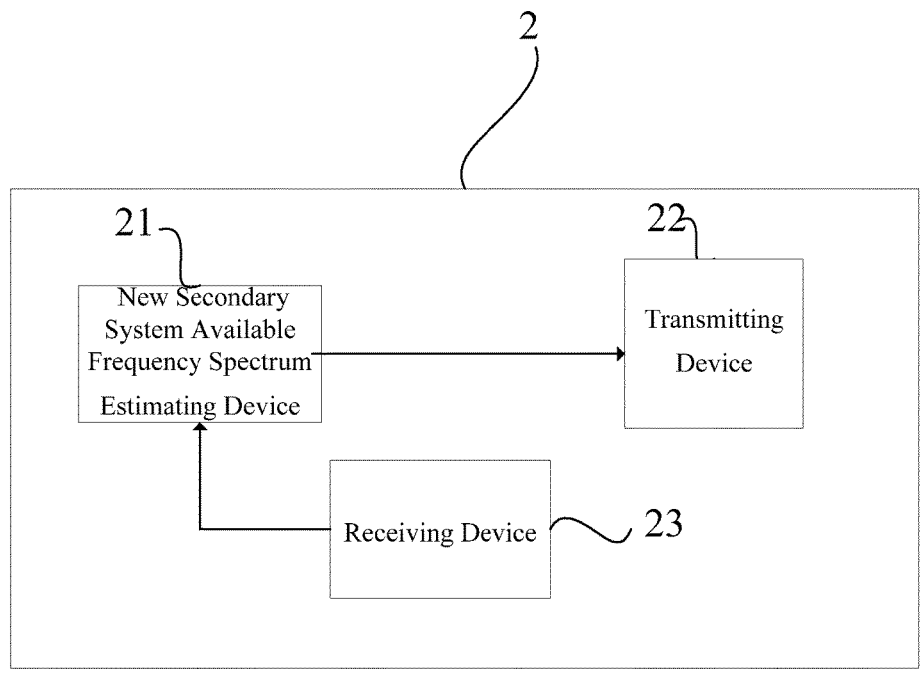
FIG. 8 is a structure block diagram schematically illustrating a radio resource management apparatus according to the second embodiment of the present disclosure.

FIG. 8 is a structure block diagram schematically illustrating a radio resource management apparatus according to the second embodiment of the present disclosure.

As shown in FIG. 8, the radio resource management apparatus 2 comprises: a new secondary system available frequency spectrum estimating device 21, a transmitting device 22 and a receiving device 23.

The new secondary system available frequency spectrum estimating device 21 determines, with respect to the primary system of the radio resource management apparatus 2, the frequency spectrum resources of the primary system that can be used by the new secondary systems that are newly added and managed by another radio resource management apparatus, as the second predicted available frequency spectrum for the new secondary system, according to the information regarding the primary system, the new secondary systems and the existing secondary systems. The specific configuration of the new secondary system available frequency spectrum estimating device 21 is similar to the configuration of the new secondary system available frequency spectrum estimating device 11 of the radio resource management apparatus 1 described in conjunction with FIGS. 2-4, and the detailed description thereof is omitted here.

The transmitting device 22 transmits information regarding the predicted available frequency spectrum for the new secondary system determined by the new secondary system available frequency spectrum estimating device 21. According to a preferred embodiment of the present disclosure, the transmitting device is further configured for transmitting information regarding a reference sub-regions with limited frequency spectrum usage for the new secondary system which is determined with respect to the primary system managed by the radio resource management apparatus and disturbance information of the existing secondary systems on the reference sub-regions with limited frequency spectrum usage for the new secondary system.

The receiving device 23 receives information regarding the new secondary systems and information regarding the available frequency spectrum of the new secondary systems determined by other radio resource management apparatus. The information regarding the new secondary systems received by the receiving device 23 can be used for the new secondary system available frequency spectrum estimating device 21 to determine the predicted available frequency spectrum for the new secondary system with respect to the primary system managed by the radio resource management apparatus 2.

According to an embodiment of the present disclosure, information regarding the new secondary systems received by the receiving device 23 includes the location of the system including the new secondary systems, transmission template and the using frequency band, etc.

According to another embodiment of the present disclosure, the receiving device 23 receives information regarding the available frequency spectrum of the new secondary systems determined by other radio resource management apparatus for adjusting the frequency spectrum usage of the existing secondary systems managed by the radio resource management apparatus if required.

For example, the radio resource management apparatus according to the second embodiment corresponds to the radio resource management apparatus D2 and D3 shown in FIG. 1.

Figure 9:
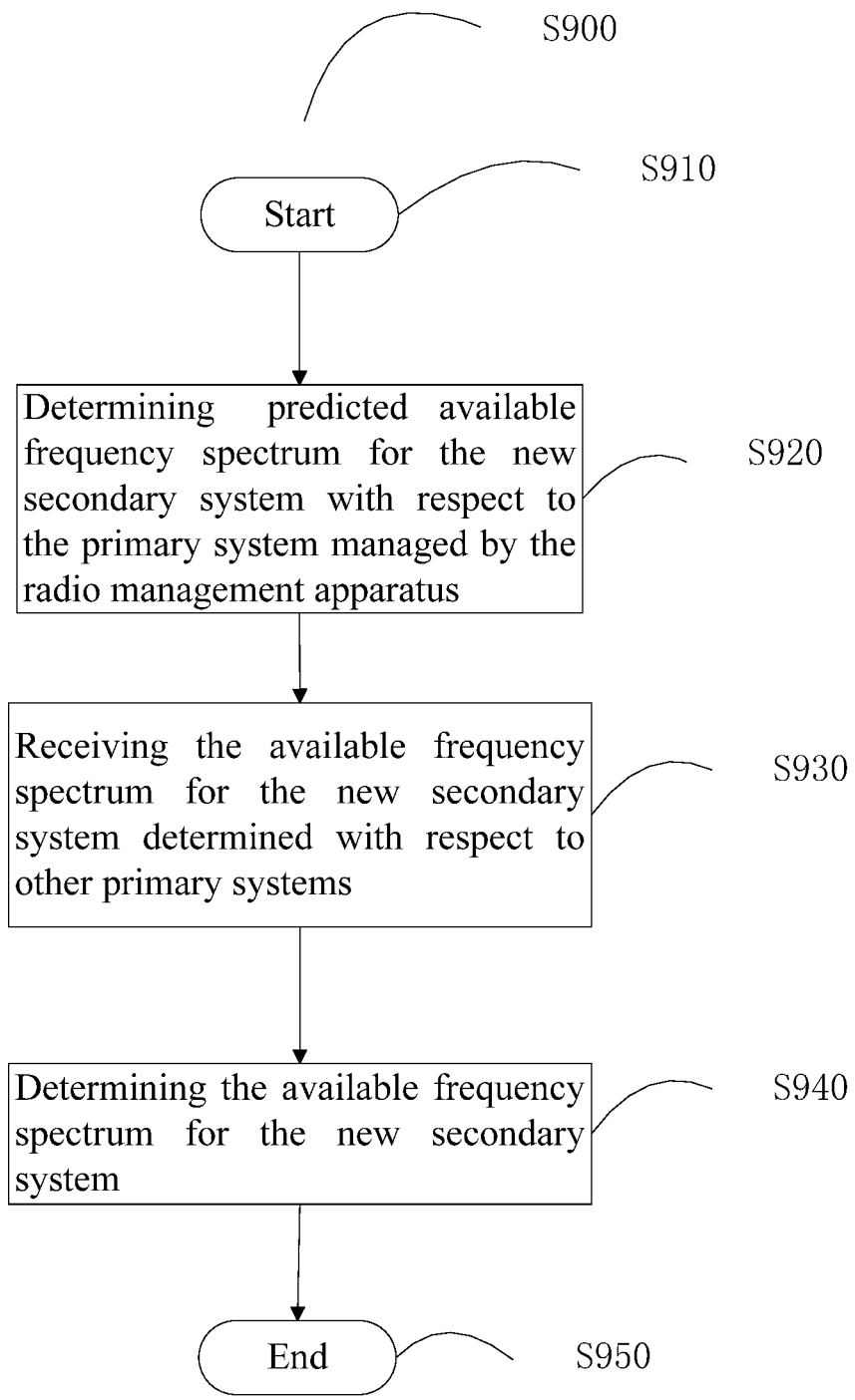
FIG. 9 is a flow chart illustrating a radio resource management method according to an embodiment of the present disclosure.

Corresponding to the radio resource management apparatus according to the first embodiment, the present disclosure provides a radio resource management method of the radio resource management apparatus for a communication system including primary systems and secondary systems. FIG. 9 is a flow chart illustrating a radio resource management method according to an embodiment of the present disclosure.

As shown in FIG. 9, the processing flow S900 of the radio resource management method according to an embodiment of the present disclosure begins with S910, then the process S920 is performed.

At S920, determining, with respect to a primary system managed by the radio resource management apparatus, a primary system frequency spectrum resource capable of being used by a new secondary system which is newly added and managed by the radio resource management apparatus, as a predicted available frequency spectrum for the new secondary system, according to information regarding to the primary system, the new secondary system and existing secondary systems. For example, it can be implemented by performing the process of the new secondary system available frequency spectrum estimating device 11 described by referring to FIGS. 2-4, and the description thereof is omitted here. Then the process S930 is performed.

At S930, receiving predicted available frequency spectrums for the new secondary system determined with respect to each of at least one of other primary systems. For example, it can be implemented by performing the process of the communication device 12 described by referring to FIG. 2, and the description thereof is omitted here. Then the process S940 is performed.

At S940, determining an available frequency spectrum for the new secondary system, according to the predicted available frequency spectrum for the new secondary system determined with respect to the primary system of the radio resource management apparatus and the predicted available frequency spectrum for the new secondary system determined with respect to the at least one of other primary systems. For example, it can be implemented by performing the process of the processing device 13 described by referring to FIG. 2 and FIGS. 5-7, and the description thereof is omitted here. Then the process S950 is performed.

The processing flow S900 is ended at S950.

Figure 10:
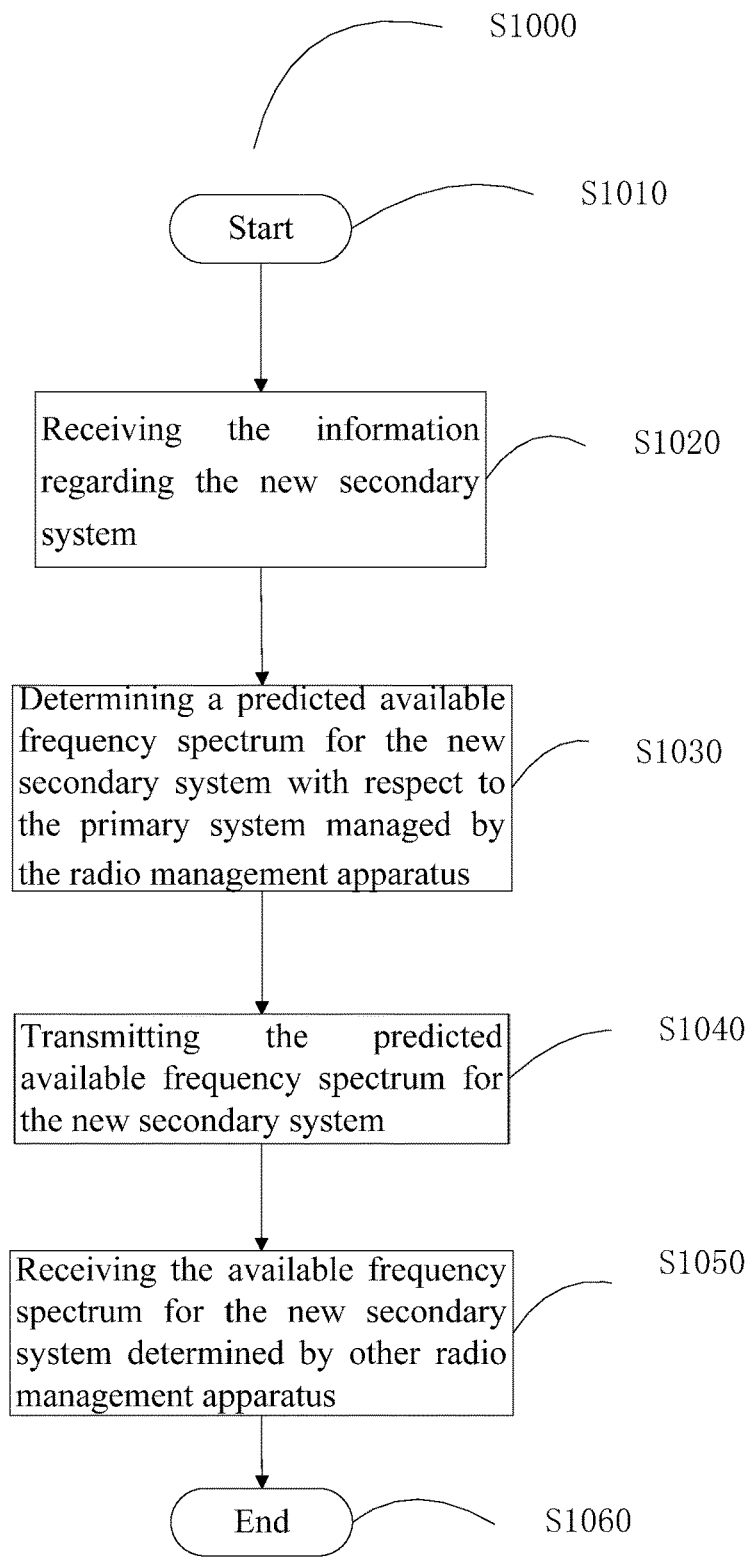
FIG. 10 is a flow chart illustrating a radio resource management method according to another embodiment of the present disclosure.

Corresponding to the radio resource management apparatus according to the second embodiment, the present disclosure provides a radio resource management method of the radio resource management apparatus for a communication system including primary systems and secondary systems. FIG. 10 is a flow chart illustrating a radio resource management method according to another embodiment of the present disclosure.

As shown in FIG. 10, the processing flow 1000 of the radio resource management method according to an embodiment of the present disclosure begins with S1010, then the process S1020 is performed.

At S1020, receiving information regarding the new secondary system that is newly added and managed by other radio resource management apparatus. For example, it can be implemented by performing the process of the receiving device 23 described by referring to FIG. 8, and the description thereof is omitted here. Then the process S1030 is performed.

At S1030, determining, with respect to a primary system managed by the radio resource management apparatus, a primary system frequency spectrum resource capable of being used by the new secondary system, as a predicted available frequency spectrum for the new secondary system, according to information regarding to the primary system, the new secondary system newly added and managed by other radio resource management apparatus and existing secondary systems. For example, it can be implemented by performing the process of the new secondary system available frequency spectrum estimating device 21 described by referring to FIG. 8, and the description thereof is omitted here. Then the process S1040 is performed.

At S1040, transmitting the predicted available frequency spectrum for the new secondary system. For example, it can be implemented by performing the process of the transmitting device 22 described by referring to FIG. 8, and the description thereof is omitted here. Then the process S1050 is performed.

At S1050, receiving information regarding an available frequency spectrum for the new secondary system determined by other radio resource management apparatus. For example, it can be implemented by performing the process of the receiving device 23 described by referring to FIG. 8, and the description thereof is omitted here. Then the process S1060 is performed.

The processing flow 1000 is ended at S1060.

According to an embodiment of the present disclosure, there is further provided a radio resource management system for a communication system including primary systems and secondary systems.

Figure 11:
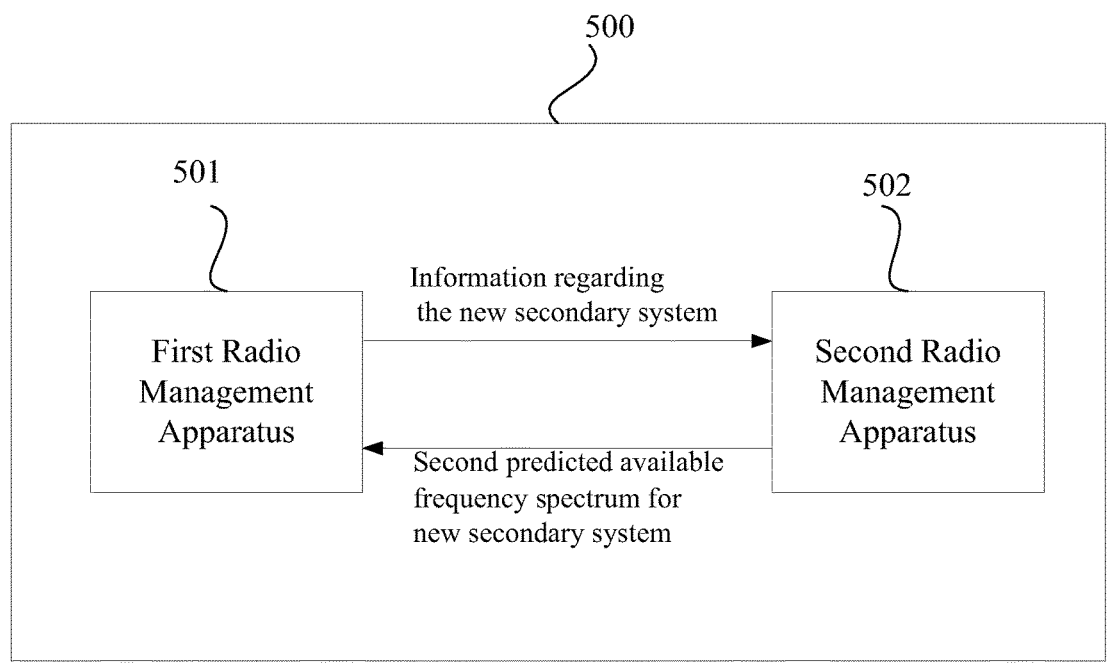
FIG. 11 is a schematic structure block diagram illustrating a radio resource management system according to an embodiment of the present disclosure.

FIG. 11 is a schematic structure block diagram illustrating a radio resource management system according to an embodiment of the present disclosure.

As shown in FIG. 11, the radio resource management system 500 comprises: a first radio resource management apparatus 501, configured for obtaining and transmitting information regarding a new secondary system newly added and managed by the first radio resource management apparatus and determining, with respect to a primary system managed by the radio resource management apparatus, a primary system frequency spectrum resource capable of being used by the new secondary system, as a first predicted available frequency spectrum for the new secondary system, according to information regarding to the primary system, the new secondary system and existing secondary systems; and a second radio resource management apparatus 502, configured for receiving the information regarding the new secondary system transmitted from the first radio resource management apparatus 501, determining, with respect to a primary system managed by the radio resource management apparatus 502, a primary system frequency spectrum resource capable of being used by a new secondary system, as a second predicted available frequency spectrum for the new secondary system, according to information regarding to the primary system managed by the second radio resource management apparatus, information regarding to the new secondary system received from the first radio resource management apparatus and information regarding to existing secondary systems, and transmitting the second predicted available frequency spectrum for the new secondary system to the first radio resource management apparatus; wherein, the first radio resource management apparatus 501 is configured for determining an available frequency spectrum for the new secondary system, according to the first predicted available frequency spectrum for the new secondary system and the second predicted available frequency spectrums for the new secondary system received from the second radio resource management apparatus 502.

Furthermore, the first radio resource management apparatus 501 can send a request to the second radio resource management apparatus 502 for obtaining information regarding the reference sub-region with limited frequency spectrum usage of the new secondary system determined with respect to the primary system managed by the second radio resource management apparatus 502 and information regarding the disturbance of the existing secondary systems on the reference sub-region with limited frequency spectrum usage. According to an embodiment of the present disclosure, the disturbance information can include information regarding the disturbance source identification (disturbance source ID) and the disturbance amount. Corresponding to the requirement from the first radio resource management apparatus 501, the second radio resource management apparatus 502 sends information regarding the reference sub-region with limited frequency spectrum usage and information regarding the disturbance of the existing secondary systems on the reference sub-region with limited frequency spectrum usage to the first radio resource management apparatus.

Herein, for example, the first radio resource management apparatus 501 may correspond to the radio resource management apparatus 1 described according to the first embodiment of the present disclosure, and the second radio resource management apparatus 502 may correspond to the radio resource management apparatus 2 described according to the second embodiment of the present disclosure, the specific operation thereof may be referred to above description of the radio resource management apparatus 1 and 2, which will not be described in detail here.

Furthermore, although it is described above that the first radio resource management apparatus 501 determines the available frequency spectrum for the new secondary system from the first predicted available frequency spectrum for the new secondary system and the second predicted available frequency spectrum for the new secondary system received from the second radio resource management apparatus 502, the present disclosure is not limited therein. It will be appreciated by those skilled in the art that, in the case that the second radio resource management apparatus 502 is configured with the processing device 13 described in conjunction with FIG. 2 and FIGS. 5-7, the available frequency spectrum for the new secondary system can also be determined by the second radio resource management apparatus 502, from the first predicted available frequency spectrum for the new secondary system received from the first radio resource management apparatus 501.

Figure 12:
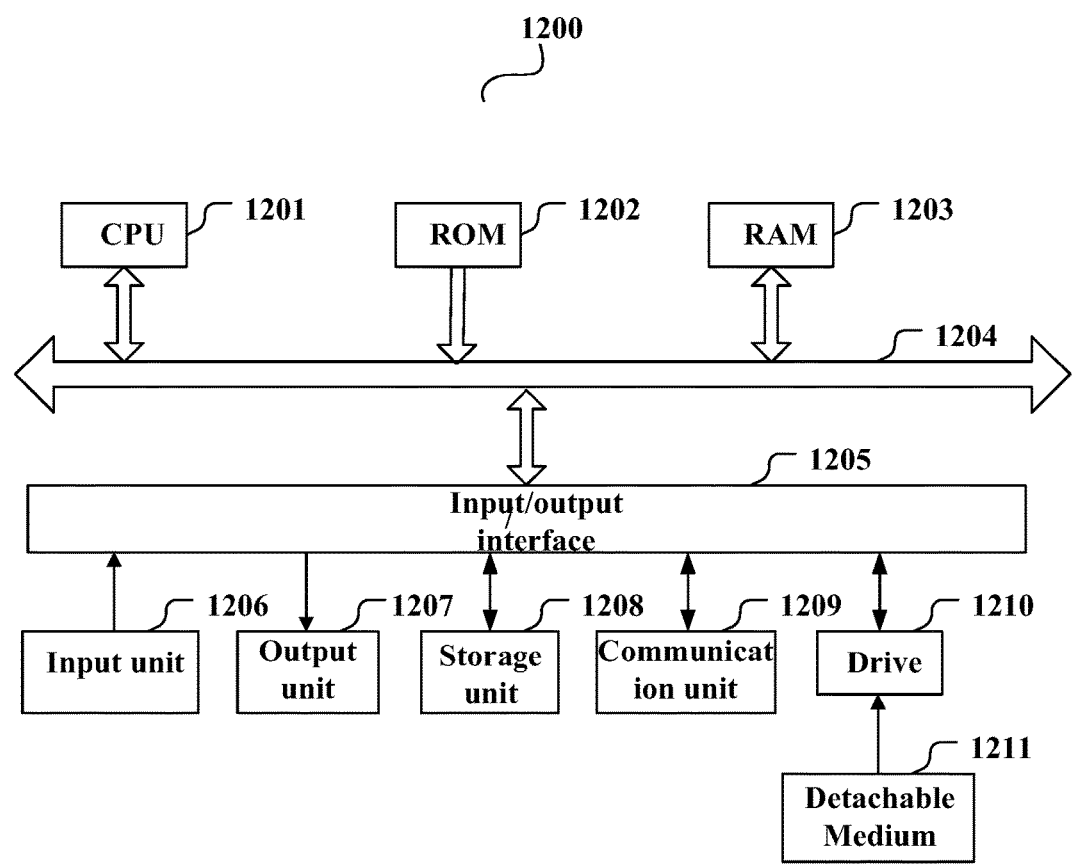
FIG. 12 is a block diagram of an exemplary hardware configuration according to an embodiment of the present disclosure.

FIG. 12 is an exemplary hardware configuration for a spectrum management apparatus according to aspects of the present disclosure. In FIG. 12, a central processing unit (CPU) 1201 perform various processes according to the program stored in the Read-Only Memory (ROM) 1202 or programs load from the storage unit 1208 to the Random Access Memory (RAM) 1203. In the RAM 1203, store also data required when the CPU 1201 performs various processes. CPU 1201, ROM 1202 and RAM 1203 are connected from one to another via bus 1204. Input/output interface 1205 is also connected to the bus 1204.

The following components are connected to the input/output interface 1205: input unit 1206 (comprising keyboard, mouse, etc.); output unit 1207 (comprising display, such as cathode ray tube (CRT), liquid crystal display (LCD), etc., and speakers and so on); storage unit 1208 (comprising hard disc, etc.); and communication part 1209 (comprising network interface cards such as LAN cards, modems and so on). The communication unit 1209 performs communication process via network like the internet. According to requirements, drive 1210 is also connected to the input/output interface 1205. Detachable medium 1211 such as disc, CD, magneto-optical disc, semiconductor memory, and so on is installed on the drive 1210 based on requirements, such that the computer program read out therefrom is installed in the storage unit 1208 based on requirements.

In case of implementing the above processes by software, programs constituting the software are installed from a network like the Internet or from a storage medium like the detachable medium 1211.

Those skilled in the art should be understood that such storage medium is not limited to the detachable medium 1211 which is stored with programs and distributes separate from the method to provide a user with program as illustrated in FIG. 12. The example of the detachable medium 1211 comprises disc (comprising floppy disc (registered marks)), CD (comprising CD read only memory (CD-ROM) and digital versatile disc (DVD)), magneto-optical disc (comprising mini-disc (MD) (registered marks)) and semiconductor memory. Alternatively, the storage medium may be ROM 1202, or hard disc comprised in the storage unit 1208 in which a program is stored and the program is distributed to a user with the method comprising the same.

Moreover, the present advancements may have the following exemplary configurations.

(1) A spectrum management system, comprising: circuitry configured to determine available spectrum for a secondary communication system based on a disturbance tolerance of a primary communication system managed by the spectrum management system and a disturbance tolerance of another primary communication system managed by another spectrum management system, and cause setting of a spectrum for the secondary communication system based on the available spectrum and whether or not a spectrum request is received from the secondary communication system.

(2) The spectrum management system of (1), wherein when no spectrum request is received from the secondary communication system, the circuitry sets, as the spectrum for the secondary communication system, a minimum one of an available spectrum based on the disturbance tolerance of the primary communication system managed by the spectrum management system and an available spectrum based on the disturbance tolerance of the primary communication system managed by the other spectrum management system.

(3) The spectrum management system of (1), wherein when a spectrum request is received from the secondary communication system and a spectrum requested is less than the available spectrum, the circuitry sets, as the spectrum for the secondary communication system, a minimum one of an available spectrum based on the disturbance tolerance of the primary communication system managed by the spectrum management system and an available spectrum based on the disturbance tolerance of the primary communication system managed by the other spectrum management system which satisfies the spectrum request.

(4) The spectrum management system of (1), wherein when a spectrum request is received from the secondary communication system and a spectrum requested is less than the available spectrum, the circuitry sets, as the spectrum for the secondary communication device, the spectrum requested.

(5) The spectrum management system of (1), wherein when a spectrum request is received from the secondary communication system and a requested spectrum exceeds the available spectrum, the circuitry causes reconfiguration of at least one other secondary communication system to release additional spectrum, and sets the available spectrum and the additional spectrum as the spectrum of the secondary communication system.

(6) The spectrum management system of any one of (1) to (5), wherein the at least one other secondary communication system is managed by the spectrum management system, and the circuitry reconfigures the at least one other secondary communication system to release the additional spectrum.

(7) The spectrum management system of any one of (5) to (6), wherein the at least one other secondary communication system is managed by the other spectrum management system, and the circuitry requests that the other spectrum management system reconfigure the at least one other secondary communication system to release the additional spectrum.

(8) The spectrum management system of (1), wherein the secondary communication system is managed by the spectrum management system.

(9) The spectrum management system of any one of (1) or (8), wherein the circuitry provides information of the secondary communication system to the other spectrum management system and receives an available spectrum based on the disturbance tolerance of the primary communication system managed by the other spectrum management system from the other spectrum management system for setting the spectrum of the secondary communication system in accordance therewith.

(10) The spectrum management system of (1), wherein the secondary communication system is managed by the other spectrum management system and the circuitry transmits the available spectrum to the other spectrum management system for setting of the spectrum of the secondary communication system in accordance therewith.

(11) The spectrum management system of (1), wherein the circuitry is further configured to determine the available spectrum for a secondary communication system based on interferences of incumbent secondary communication systems managed by the spectrum management system and incumbent secondary communication systems managed by the other spectrum communication system.

(12) A method of managing spectrum, comprising: determining, in circuitry of a spectrum management system, available spectrum for a secondary communication system based on a disturbance tolerance of a primary communication system managed by the spectrum management system and a disturbance tolerance of another primary communication system managed by another spectrum management system; and causing, by the circuitry of the spectrum management system, setting of a spectrum for the secondary communication system based on the available spectrum and whether or not a spectrum request is received from the secondary communication system.

(13) The method of managing spectrum of (12), further comprising: setting the spectrum for the secondary communication system to a minimum one of an available spectrum based on the disturbance tolerance of the primary communication system managed by the spectrum management system and an available spectrum based on the disturbance tolerance of the primary communication system managed by the other spectrum management system, when a spectrum request for less than the available spectrum is received or when no spectrum request is received.

(14) The method of managing spectrum of (12), further comprising: setting the spectrum for the secondary communication system to a requested spectrum based on a received spectrum request, when the requested spectrum is less than the available spectrum.

(15) The method of managing spectrum of (12), further comprising: causing another secondary communication system to release additional spectrum, and setting the spectrum for the secondary communication system to a combination of the additional spectrum and the available spectrum, when a received spectrum request exceeds the available spectrum.

(16) The method of managing spectrum of (12), further comprising: transmitting the available spectrum determined to the other spectrum management system for setting of the spectrum of the secondary communication system when the other spectrum management system manages the secondary communication system.

(17) A non-transitory computer-readable medium encoded with computer-readable instructions thereon, the computer-readable instructions, when executed by a computer, cause the computer to perform a method, comprising: determining available spectrum for a secondary communication system based on a disturbance tolerance of a primary communication system managed by a spectrum management system and a disturbance tolerance of another primary communication system managed by another spectrum management system; and causing setting of a spectrum for the secondary communication system based on the available spectrum and whether or not a spectrum request is received from the secondary communication system.

(18) A spectrum management system, comprising: circuitry configured to determine available spectrum for a secondary communication system based on a disturbance tolerance of a primary communication system managed by the spectrum management system and interferences of incumbent secondary communication systems managed by the spectrum management system and incumbent secondary communication systems managed by another spectrum management system, and cause setting of a spectrum for the secondary communication system based on the available spectrum.

(19) The spectrum management system of (18), wherein the circuitry obtains information of the incumbent secondary communication systems managed by the other spectrum management system to determine the interferences.

(20) The spectrum management system of (18), wherein the circuitry determined the available resource based on a margin of the disturbance tolerance and the interferences.

(21) The spectrum management system of (18), wherein the circuitry causes reconfiguration of at least one incumbent secondary communication system to accommodate a spectrum need of the secondary communication system.

(22) A radio resource management apparatus for a communication system including primary systems and secondary systems, the radio resource management apparatus comprising: a new secondary system available frequency spectrum estimating device configured for determining, with respect to a primary system managed by the radio resource management apparatus, a primary system frequency spectrum resource capable of being used by a new secondary system which is newly added and managed by the radio resource management apparatus, as a predicted available frequency spectrum for the new secondary system, according to information regarding to the primary system, the new secondary system and existing secondary systems; a communication device configured for obtaining predicted available frequency spectrums for the new secondary system determined with respect to each of at least one of other primary systems; and a processing device configured for determining an available frequency spectrum for the new secondary system, according to the predicted available frequency spectrum for the new secondary system obtained by the new secondary system available frequency spectrum estimating device and the predicted available frequency spectrums for the new secondary system obtained by the communication device.

(23) The radio resource management apparatus of (22), wherein, the processing device is configured for selecting a minimum predicted available frequency spectrum for the new secondary system from the predicted available frequency spectrum for the new secondary system obtained by the new secondary system available frequency spectrum estimating device and the predicted available frequency spectrums for the new secondary system obtained by the communication device, as the available frequency spectrum for the new secondary system.

(24) The radio resource management apparatus of any one of (22) to (23), wherein, the communication device is further configured for obtaining information regarding an expected using frequency spectrum for the new secondary system, and the processing device is further configured for determining an adjustment to the frequency spectrums used by existing secondary systems according to the relationship between the expected using frequency spectrum for the new secondary system and each of the predicted available frequency spectrums for the new secondary system, so that the available frequency spectrum for the new secondary system correspond to its expected using frequency spectrum.

(25) The radio resource management apparatus of (24), wherein, the new secondary system available frequency spectrum estimating device comprises: a frequency spectrum usage limited reference sub-region determining unit configured for determining, with respect to the primary system managed by the radio resource management apparatus, a reference sub-region with limited frequency spectrum usage for a new secondary system which is newly added and managed by the radio resource management apparatus, according to the using condition of the frequency spectrum of the primary system and the information regarding the new secondary system; and a new secondary system predicted available frequency spectrum determining unit configured for determining, with respect to the reference sub-region with limited frequency spectrum usage, a primary system frequency spectrum capable of being used by the new secondary system, as the predicted available frequency spectrum for the new secondary system, according to the disturbance of existing secondary system on the reference sub-region with limited frequency spectrum usage.

(26) The radio resource management apparatus of (25), wherein, the new secondary system predicted available frequency spectrum determining unit comprises: a disturbance amount obtaining module configured for determining a maximum disturbance amount allowed to be generated when the new secondary system is using the frequency spectrum of the primary system managed by the radio resource management apparatus, according to the difference between the disturbance upper limit allowed by the primary system and the disturbance amount of the existing secondary systems on the reference sub-region with limited frequency spectrum usage; and a new secondary system predicted available frequency spectrum determining module configured for determining, with respect to the reference sub-region with limited frequency spectrum usage, a primary system frequency spectrum capable of being used by the new secondary system as the predicted available frequency spectrum for the new secondary system, according to the maximum disturbance amount determined by the disturbance amount obtaining module.

(27) The radio resource management apparatus of any one of (25) to (26), wherein, the communication device is further configured for obtaining information regarding to reference sub-regions with limited frequency spectrum usage for the new secondary system determined with respect to each of the at least one of other primary systems, and disturbance information of the existing secondary systems on the reference sub-regions with limited frequency spectrum usage.

(28) The radio resource management apparatus of (27), wherein, the disturbance information comprises local disturbance information and non-local disturbance information on the reference sub-regions with limited frequency spectrum usage.

(29) The radio resource management apparatus of (28), wherein, each of the local disturbance information and non-local disturbance information comprises information of identifications of disturbance sources and disturbance amounts.

(30) The radio resource management apparatus of any one of (27) to (29), wherein, the processing device comprises: an adjusting sub-region determining unit configured for determining reference sub-regions with limited frequency spectrum usage that need to be adjusted, among the reference sub-region with limited frequency spectrum usage determined with respect to the primary system managed by the radio resource management apparatus and the reference sub-regions with limited frequency spectrum usage determined with respect to each of the at least one of other primary system, according to the relationship between expected using frequency spectrum for the new secondary system and each of the predicted available spectrums for the new secondary system; and an existing secondary system adjustment determining unit configured for determining the adjustment to the frequency spectrums used by the existing secondary systems according to the determined reference sub-regions with limited frequency spectrum usage that need to be adjusted.

(31) The radio resource management apparatus of (30), wherein, the adjusting sub-region determining unit is configured for determining the following reference sub-regions with limited frequency spectrum usage as the reference sub-regions with limited frequency spectrum usage that need to be adjusted: the predicted available frequency spectrum for the new secondary system determined with respect to the reference sub-region with limited frequency spectrum usage is smaller than the expected using frequency spectrum for the new secondary system.

(32) The radio resource management apparatus of any one of (30) to (31), wherein, the existing secondary system adjustment determining unit is configured for determining, with respect to each of the reference sub-regions with limited frequency spectrum usage that need to be adjusted, the existing secondary systems whose frequency spectrum usage needs to be adjusted and the frequency spectrum usage adjusting amount thereof, according to frequency spectrum using priorities.

(33) The radio resource management apparatus of (32), wherein, the existing secondary system adjustment determining unit comprises: an existing secondary system to be adjusted determining module configured for determining, with respect to each of the reference sub-regions with limited frequency spectrum usage that need to be adjusted, existing secondary systems to be adjusted whose frequency spectrum usage need to be adjusted, according to the frequency spectrum using priorities of each secondary system; and a frequency spectrum usage adjusting amount determining module configured for determining the frequency spectrum usage adjusting amounts of respective existing secondary systems that need to be adjusted, so as to satisfy the following secondary system frequency spectrum adjusting conditions with respect to each of the reference sub-regions with limited frequency spectrum usage: for respective existing secondary systems to be adjusted that generate disturbance on the reference sub-region with limited frequency spectrum usage, the sum of the determined frequency spectrum usage adjusting amounts is equal to or larger than the difference between the expecting useable frequency for the new secondary system and the predicted available frequency spectrum for the new secondary system with respect to the reference sub-region with limited frequency spectrum usage.

(34) The radio resource management apparatus of (33), wherein, the frequency spectrum usage adjusting amount determining module is further configured for determining, with respect to each of the reference sub-regions with limited frequency spectrum that need to be adjusted, the frequency spectrum usage adjusting amounts of respective existing secondary systems to be adjusted by using the proportions of the disturbance amounts of the respective existing secondary systems to be adjusted on the reference sub-region with limited frequency spectrum.

(35) The radio resource management apparatus of any one of (33) to (34), wherein, the existing secondary system to be adjusted determining module is further configured for, with respect to each of the reference sub-regions with limited frequency spectrum usage that need to be adjusted: determining existing secondary systems that generate disturbance on the reference sub-regions with limited frequency spectrum usage as the existing secondary systems to be adjusted whose frequency spectrum usage need to be adjusted, if the new secondary system and the reference sub-region with limited frequency spectrum usage are located in the region managed by the same radio resource management apparatus; determining existing secondary systems that generate disturbance on the reference sub-region with limited frequency spectrum usage excluding the existing secondary systems that are located, together with the reference sub-region with limited frequency spectrum usage, in the region managed by the same radio resource management apparatus, as the existing secondary systems to be adjusted whose frequency spectrum usage need to be adjusted, if the new secondary system and the reference sub-region with limited frequency spectrum usage are not located in the region managed by the same radio resource management apparatus.

(36) The radio resource management apparatus of any one of (33) to (35), wherein, the frequency spectrum usage adjusting amount determining module is further configured for sequentially determining the frequency spectrum usage adjusting amount of respective existing secondary systems to be adjusted for each of the reference sub-regions with limited frequency spectrum usage that need to be adjusted, among all determined reference sub-regions with limited frequency spectrum usage that need to be adjusted, expected using frequency spectrum in a descending order with respect to the difference between the expected using frequency spectrum for the new secondary system and the new secondary system predicted available frequency spectrum for reference sub-region with limited frequency spectrum usage, so as to satisfy the secondary system frequency spectrum adjusting conditions for each of the reference sub-regions with limited frequency spectrum usage.

(37) The radio resource management apparatus of (36), wherein, the frequency spectrum usage adjusting amount determining module comprises: an initial adjusting amount obtaining sub-module configured for taking the frequency spectrum usage adjusting amounts determined with respect to each of the reference sub-regions with limited frequency spectrum usage that need to be adjusted, as initial frequency spectrum usage adjusting amounts; an initial adjusting amount verifying sub-module configured for verifying whether the initial frequency spectrum usage adjusting amounts satisfy with the secondary system frequency spectrum adjusting conditions for other reference sub-regions with limited frequency spectrum usage; and a final adjusting amount obtaining sub-module configured for determining the initial frequency spectrum usage adjusting amount as a final frequency spectrum usage adjusting amount for adjusting the frequency spectrum usage of respective existing secondary systems to be adjusted in the case that the initial frequency spectrum usage adjusting amounts are verified as satisfied, and correct the initial frequency spectrum usage adjusting amounts such that the corrected frequency spectrum usage adjusting amounts satisfy with the secondary system frequency spectrum adjusting conditions for all the reference sub-regions with limited frequency spectrum usage and determining the corrected frequency spectrum usage adjusting amounts as the final frequency spectrum usage adjusting amounts for adjusting the frequency spectrum usage of respective existing secondary system to be adjusted in the case that the initial frequency spectrum usage adjusting amounts are verified as not satisfied.

(38) The radio resource management apparatus of any one of (22) to (37), wherein, the primary system managed by the radio resource management apparatus and the at least one of other primary system are located in different regions, wherein, the spectrum frequency using information can not be shared among the different regions.

(39) A radio resource management method used by a radio resource management apparatus for a communication system including primary systems and secondary systems, the radio resource management method comprising: determining, with respect to a primary system managed by the radio resource management apparatus, a primary system frequency spectrum resource capable of being used by a new secondary system which is newly added and managed by the radio resource management apparatus, as a predicted available frequency spectrum for the new secondary system, according to information regarding to the primary system, the new secondary system and existing secondary systems; receiving predicted available frequency spectrums for the new secondary system determined with respect to each of at least one of other primary systems; and determining an available frequency spectrum for the new secondary system, according to the predicted available frequency spectrum for the new secondary system determined with respect to the primary system managed by the radio resource management apparatus and the predicted available frequency spectrum for the new secondary system determined with respect to the at least one of other primary systems.

(40) A radio resource management apparatus for a communication system including primary systems and secondary systems, the radio resource management apparatus comprising: a new secondary system available frequency spectrum estimating device configured for determining, with respect to a primary system managed by the radio resource management apparatus, a primary system frequency spectrum resource capable of being used by a new secondary system managed by another radio resource management apparatus, as a predicted available frequency spectrum for the new secondary system, according to information regarding to the primary system, the new secondary system and existing secondary systems; a transmitting device configured for transmitting the predicted available frequency spectrum for the new secondary system; and a receiving device configured for receiving the information regarding the new secondary system and an available frequency spectrum for the new secondary system determined by the another radio resource management apparatus according to the predicted available frequency spectrum for the new secondary system transmitted by the transmitting device.

(41) The radio resource management apparatus of (40), wherein, the information regarding the new secondary system includes the system position of the new secondary system, transmitting template and the using frequency band.

(42) The radio resource management apparatus of any one of (40) to (41), wherein, the transmitting device is further configured for transmitting information regarding a reference sub-region with limited frequency spectrum usage for the new secondary system which is determined with respect to the primary system managed by the radio resource management apparatus and disturbance information of the existing secondary systems on the reference sub-region with limited frequency spectrum usage for the new secondary system.

(43) A radio resource management method used by a radio resource management apparatus for a communication system including primary systems and secondary systems, the radio resource management method comprising: receiving information regarding a new secondary system newly added and managed by another radio resource management apparatus; determining, with respect to a primary system managed by the radio resource management apparatus, a primary system frequency spectrum resource capable of being used by the new secondary system, as a predicted available frequency spectrum for the new secondary system, according to information regarding to the primary system, the new secondary system newly added and managed by the another radio resource management apparatus and existing secondary systems; transmitting the predicted available frequency spectrum for the new secondary system; and receiving information regarding an available frequency spectrum for the new secondary system determined by the another radio resource management apparatus.

(44) A radio resource management system for a communication system including primary systems and secondary systems, the radio resource management system comprising: a first radio resource management apparatus configured for obtaining and transmitting information regarding a new secondary system newly added and managed by the first radio resource management apparatus and determining, with respect to a primary system managed by the radio resource management apparatus, a primary system frequency spectrum resource capable of being used by the new secondary system, as a first predicted available frequency spectrum for the new secondary system, according to information regarding to the primary system, the new secondary system and existing secondary systems; and a second radio resource management apparatus configured for receiving the information regarding the new secondary system transmitted from the first radio resource management apparatus, determining, with respect to a primary system managed by the radio resource management apparatus, a primary system frequency spectrum resource capable of being used by a new secondary system, as a second predicted available frequency spectrum for the new secondary system, according to information regarding to the primary system managed by the second radio resource management apparatus, information regarding to the new secondary system received from the first radio resource management apparatus and information regarding to existing secondary systems, and transmitting the second predicted available frequency spectrum for the new secondary system to the first radio resource management apparatus; wherein, the first radio resource management apparatus is configured for determining an available frequency spectrum for the new secondary system, according to the first predicted available frequency spectrum for the new secondary system and the second predicted available frequency spectrums for the new secondary system received from the second radio resource management apparatus.

(45) A radio resource management system for a communication system including primary systems and secondary systems, the radio resource management system comprising: a first radio resource management apparatus configured for obtaining and transmitting information regarding a new secondary system newly added and managed by the first radio resource management apparatus and determining, with respect to a primary system managed by the radio resource management apparatus, a primary system frequency spectrum resource capable of being used by the new secondary system, as a first predicted available frequency spectrum for the new secondary system, according to information regarding to the primary system, the new secondary system and existing secondary systems; and a second radio resource management apparatus configured for receiving the information regarding the new secondary system transmitted from the first radio resource management apparatus, determining, with respect to a primary system managed by the radio resource management apparatus, a primary system frequency spectrum resource capable of being used by a new secondary system, as a second predicted available frequency spectrum for the new secondary system, according to information regarding to the primary system managed by the second radio resource management apparatus, information regarding to the new secondary system received from the first radio resource management apparatus and information regarding to existing secondary systems, and transmitting the second predicted available frequency spectrum for the new secondary system to the first radio resource management apparatus; wherein, the first radio resource management apparatus is configured for determining an available frequency spectrum for the new secondary system, according to the first predicted available frequency spectrum for the new secondary system and the second predicted available frequency spectrums for the new secondary system received from the second radio resource management apparatus.

As Compared with the prior art, the radio resource management apparatus, method and system according to embodiments of the present disclosure can reasonably determine the available frequency spectrum for the new secondary system at least for the newly added secondary system, so that the new secondary system can obtain the best available frequency spectrum in the case of guaranteeing the normal usage of the frequency spectrum resource by each primary systems.

APPLICATION EXAMPLES

Many countries in Europe have completed or is performing the conversion from analog TV to digital TV. Many countries are studying how to make the communication system to utilize the television broadcast frequency band in the case of no disturbance being brought to television broadcasting services, and this is the technical problem to be solved at present. Currently, the control way widely accepted is to utilize the database, countries store the usage condition of their digital TV frequency spectrum in the management database, and when the communication system needs to use TV frequency spectrum in a certain area, the database responsible for managing the frequency spectrum usage in the area (corresponding to the radio resource management apparatus according to embodiments of the present disclosure) calculates the available frequency spectrum resources for the new communication system according to the actual situation of the frequency spectrum usage of television broadcasting services and the communication system currently using TV frequency spectrum. Many European countries are bordering each other, the frequency spectrum usage of a certain country (corresponding to one region according to embodiments of the present disclosure) may bring disturbance to the television broadcasting systems of other countries. Therefore, neighboring countries need to perform coordination when using the frequency spectrum. According to the present disclosure, there is proposed the way of the databases of neighboring countries adjusting the existing secondary systems in respective management regions when a certain country has a new communication system that wishes to utilize the television broadcast frequency band, so that the new communication system can utilize the television broadcast frequency band without bringing disturbance to the television broadcasting systems of other countries.

As should be explained here, said management database may be aimed at either the database provided for each country or the centralized database provided over the databases of respective countries, each country registers the information regarding the secondary systems that may bring disturbance to other countries in the centralized database, further, registers the information regarding the related disturbance of its own which is brought by other countries in the centralized database.

Modules and units in the above apparatus can be configured by ways of software, firmware, hardware, or a combination thereof. The specific means or ways that can be used by the configuration are well known by those skilled in the art, which will not be described in detail herein. In the case of software or firmware implementation, programs constituting the software are installed to a computer with a dedicated hardware structure from a storage medium or a network, wherein the computer can execute various corresponding functions when being installed various programs.

The spectrum management method and the spectrum management apparatus according to the embodiment of the disclosure may be configured by software, firmware, hardware or the combination thereof. In case of implementing by software or firmware, program constituting the software or firmware may be mounted to a machine having a dedicated hardware structure from a storage medium or network (for example, the universal computer 1200 as illustrated in FIG. 12), when the computer is mounted with various programs, the computer may execute various functions of the components and units as describe above.

In FIG. 12, a central processing unit (CPU) 1201 perform various processes according to the program stored in the Read-Only Memory (ROM) 1202 or programs load from the storage unit 1208 to the Random Access Memory (RAM) 1203. In the RAM 1203, store also data required when the CPU 1201 performs various processes. CPU 1201, ROM 1202 and RAM 1203 are connected from one to another via bus 1204. Input/output interface 1205 is also connected to the bus 1204.

The following components are connected to the input/output interface 1205: input unit 1206 (comprising keyboard, mouse, etc.); output unit 1207 (comprising display, such as cathode ray tube (CRT), liquid crystal display (LCD), etc., and speakers and so on); storage unit 1208 (comprising hard disc, etc.); and communication part 1209 (comprising network interface cards such as LAN cards, modems and so on). The communication unit 1209 performs communication process via network like the internet. According to requirements, drive 1210 is also connected to the input/output interface 1205. Detachable medium 1211 such as disc, CD, magneto-optical disc, semiconductor memory, and so on is installed on the drive 1210 based on requirements, such that the computer program read out therefrom is installed in the storage unit 1208 based on requirements.

In case of implementing the above processes by software, programs constituting the software are installed from a network like the Internet or from a storage medium like the detachable medium 1211.

Those skilled in the art should be understood that such storage medium is not limited to the detachable medium 1211 which is stored with programs and distributes separate from the method to provide a user with program as illustrated in FIG. 12. The example of the detachable medium

1211 comprises disc (comprising floppy disc (registered marks)), CD (comprising CD read only memory (CD-ROM) and digital versatile disc (DVD)), magneto-optical disc (comprising mini-disc (MD) (registered marks)) and semiconductor memory. Alternatively, the storage medium may be ROM 1202, or hard disc comprised in the storage unit 1208 in which a program is stored and the program is distributed to a user with the method comprising the same.

The disclosure also provides a program product storing machine readable instruction code. When read and executed by a machine, the instruction code may implement the communication methods according to the embodiments of the disclosure. Correspondingly, various storage medium for carrying the program product such as magnetic disk, optical disk, magneto-optical disk, semiconductor memory, etc. is also comprised in the disclosure.

In addition, obviously, respective operations of the communication methods according to the embodiments of the disclosure may also be implemented in a manner of computer executable program stored in various machine readable storage mediums.

The present disclosure also provides a program product in which machine readable instruction codes are stored. The method according to embodiments of the present disclosure can be executed when the instruction code is read and executed by the machine.

Accordingly, the storage medium for carrying the above program product in which the machine-readable instruction codes are stored is also included in the disclosure of the present invention. The storage medium includes but not limited to a floppy disk, an optical disk, a magneto-optical disk, a memory card, a memory stick, etc.

Finally, as should be further explained, such relational terms as left and right, first and second, etc., when used in the present disclosure, are merely used to differentiate one entity or operation from another entity or operation, without necessarily requiring or suggesting that these entities or operations have therebetween any such actual relation or sequence. Moreover, terms 'comprise', 'include' or other variants and any variants thereof are meant to cover non-exclusive inclusion, so that processes, methods, objects or devices that include a series of elements not only include these elements, but also include other elements not explicitly listed, or further include elements inherent in the processes, methods, objects or devices. Without more restrictions, an element defined by the sentence 'including a . . . ' does not preclude the further inclusion of other identical elements in the processes, methods, objects or devices that include this element.

The invention claimed is:

1. A spectrum management system, comprising:
circuitry configured to
determine an available spectrum for an existing secondary communication system based on an allowable range of a disturbance tolerance of a first primary communication system managed by the spectrum management system and an allowable range of a disturbance tolerance of a second another primary communication system managed by another spectrum management system;
determine a reference sub-region with a limited frequency spectrum usage for an added secondary communication system according to a use condition of a frequency spectrum of the first primary communication system and information regarding the added secondary communication system, including determining, as the reference sub-region, a region in which an edge of a service region of the first primary communication system that is nearest to the added secondary communication system or a certain region in a coverage range of the first primary communication system which is disturbed by the added secondary communication system; and
determine with respect to the reference sub-region, a primary system frequency spectrum that is being used by the added secondary communication system, as a predicted available frequency spectrum for the added secondary communication system, according to a disturbance of the existing secondary communication system on the reference sub-region.

2. The spectrum management system according to claim 1, wherein when no spectrum request is received from the added secondary communication system, the circuitry sets, as the spectrum for the added secondary communication system, a minimum one of an available spectrum based on the disturbance tolerance of the first primary communication system managed by the spectrum management system and an available spectrum based on the disturbance tolerance of the second primary communication system managed by the other spectrum management system.

3. The spectrum management system according to claim 1, wherein when the spectrum request is received from the added secondary communication system and a spectrum requested is less than the available spectrum, the circuitry sets, as the spectrum for the added secondary communication system, a minimum one of an available spectrum based on the disturbance tolerance of the first primary communication system managed by the spectrum management system and an available spectrum based on the disturbance tolerance of the second primary communication system managed by the other spectrum management system which satisfies the spectrum request.

4. The spectrum management system according to claim 1, wherein when the spectrum request is received from the added secondary communication system and a spectrum requested is less than the available spectrum, the circuitry sets, as the spectrum for the added secondary communication system, the spectrum requested.

5. The spectrum management system according to claim 1, wherein when the spectrum request is received from the added secondary communication system and a requested spectrum exceeds the available spectrum, the circuitry causes reconfiguration of at least one other secondary communication system to release additional spectrum, and sets the available spectrum and the additional spectrum as the spectrum of the added secondary communication system.

6. The spectrum management system according to claim 5, wherein the at least one other secondary communication system is managed by the spectrum management system, and the circuitry reconfigures the at least one other secondary communication system to release the additional spectrum.

7. The spectrum management system according to claim 5, wherein the at least one other secondary communication system is managed by the other spectrum management system, and the circuitry requests that the other spectrum management system reconfigure the at least one other secondary communication system to release the additional spectrum.

8. The spectrum management system according to claim 1, wherein the existing secondary communication system is managed by the spectrum management system.

9. The spectrum management system according to claim 8, wherein the circuitry provides information of the existing secondary communication system to the other spectrum management system and receives an available spectrum based on the disturbance tolerance of the second primary communication system managed by the other spectrum management system from the other spectrum management system for setting the spectrum of the secondary communication system in accordance therewith.

10. The spectrum management system according to claim 1, wherein the existing secondary communication system is managed by the other spectrum management system and the circuitry transmits the available spectrum to the other spectrum management system for setting of the spectrum of the existing secondary communication system in accordance therewith.

11. The spectrum management system according to claim 1, wherein the circuitry is further configured to determine the available spectrum for the added secondary communication system based on interferences of the existing secondary communication system managed by the spectrum management system and other existing secondary communication systems managed by the other spectrum communication system.

12. A method of managing spectrum, comprising:
  determining, in circuitry of a spectrum management system, an available spectrum for an existing secondary communication system based on an allowable range of a disturbance tolerance of a first primary communication system managed by the spectrum management system and an allowable range of a disturbance tolerance of a second primary communication system managed by another spectrum management system;
  determining a reference sub-region with limited frequency spectrum usage for an added secondary communication system according to a use condition of a frequency spectrum of the first primary communication system and information regarding the added secondary communication system, including determining, as the reference sub-region in which an edge of a service region of the first primary communication system that is nearest to the added secondary communication system or a certain region in a coverage range of the first primary communication system which is disturbed by the added secondary communication system; and
  determining with respect to the reference sub-region, a primary system frequency spectrum that is being used by the added secondary communication system, as a predicted available frequency spectrum for the added secondary communication system, according to a disturbance of the existing secondary communication system on the reference sub-region.

13. The method of managing spectrum according to claim 12, further comprising:
  setting the spectrum for the added secondary communication system to a minimum one of an available spectrum based on the disturbance tolerance of the first primary communication system managed by the spectrum management system and an available spectrum based on the disturbance tolerance of the second primary communication system managed by the other spectrum management system, when a spectrum request for less than the available spectrum is received or when no spectrum request is received.

14. The method of managing spectrum according to claim 12, further comprising:
  setting the spectrum for the added secondary communication system to a requested spectrum based on a received spectrum request, when the requested spectrum is less than the available spectrum.

15. The method of managing spectrum according to claim 12, further comprising:
  causing another secondary communication system to release additional spectrum, and setting the spectrum for the added secondary communication system to a combination of the additional spectrum and the available spectrum, when a received spectrum request exceeds the available spectrum.

16. A non-transitory computer-readable medium encoded with computer-readable instructions thereon, the computer-readable instructions, when executed by a computer, cause the computer to perform a method, comprising:
  determining an available spectrum for a secondary communication system based on an allowable range of a disturbance tolerance of a first primary communication system managed by a spectrum management system and an allowable range of a disturbance tolerance of a second primary communication system managed by another spectrum management system;
  determining a reference sub-region with limited frequency spectrum usage for an added secondary communication system according to a use condition of a frequency spectrum of the first primary communication system and information regarding the added secondary communication system, including determining, as the reference sub-region in which an edge of a service region of the first primary communication system that is nearest to the added secondary communication system or a certain region in a coverage range of the first primary communication system which is disturbed by the added secondary communication system; and
  determining with respect to the reference sub-region, a primary system frequency spectrum that is being used by the added secondary communication system, as a predicted available frequency spectrum for the added secondary communication system, according to a disturbance of the existing secondary communication system on the reference sub-region.

* * * * *